(12) United States Patent
Hadad et al.

(10) Patent No.: US 11,124,054 B1
(45) Date of Patent: Sep. 21, 2021

(54) AXLE ASSEMBLY HAVING A SENSOR FOR DETECTING A SHIFT COLLAR

(71) Applicant: ArvinMeritor Technology, LLC, Troy, MI (US)

(72) Inventors: Yousif Hadad, Troy, MI (US); Banuchandar Muthukumar, Troy, MI (US); Chetankumar Ghatti, Troy, MI (US); Edvin Godo, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/063,866

(22) Filed: Oct. 6, 2020

(51) Int. Cl.
| | |
|---|---|
| *B60K 1/00* | (2006.01) |
| *B60K 17/02* | (2006.01) |
| *B60K 17/08* | (2006.01) |
| *F16H 3/44* | (2006.01) |
| *F16D 11/10* | (2006.01) |

(52) U.S. Cl.
CPC .............. *B60K 1/00* (2013.01); *B60K 17/02* (2013.01); *B60K 17/08* (2013.01); *F16D 11/10* (2013.01); *F16H 3/44* (2013.01); *B60K 2001/001* (2013.01); *F16D 2300/18* (2013.01)

(58) Field of Classification Search
CPC .......... B60K 1/00; B60K 17/08; B60K 17/02; B60K 2001/001; F16D 11/10; F16H 3/44
See application file for complete search history.

(56) References Cited

U.S. PATENT DOCUMENTS

| | | | |
|---|---|---|---|
| 9,566,857 B1 * | 2/2017 | Pritchard | B60K 6/387 |
| 9,719,563 B2 | 8/2017 | Hirao | |
| 10,378,634 B2 * | 8/2019 | Kluck | B60K 17/16 |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2019/0366838 A1 | 12/2019 | Hirao et al. | |
| 2020/0173494 A1 | 6/2020 | Smith et al. | |
| 2020/0173531 A1 | 6/2020 | Smith | |
| 2020/0173535 A1 | 6/2020 | Peng et al. | |
| 2020/0173537 A1 | 6/2020 | Bgov et al. | |
| 2020/0173541 A1 | 6/2020 | Soffner et al. | |
| 2020/0177049 A1 | 6/2020 | Raya et al. | |
| 2020/0177059 A1 | 6/2020 | Smith et al. | |
| 2020/0247236 A1 | 8/2020 | Hirao et al. | |

* cited by examiner

*Primary Examiner* — David J Hlavka
(74) *Attorney, Agent, or Firm* — Brooks Kushman PC

(57) ABSTRACT

An axle assembly having a shift collar and a sensor. The shift collar may be rotatable about a first axis and moveable along the first axis. The sensor may detect detection features associated with the shift collar and provide a signal that may be indicative of rotation of the shift collar about the first axis and positioning of the shift collar along the first axis.

20 Claims, 24 Drawing Sheets

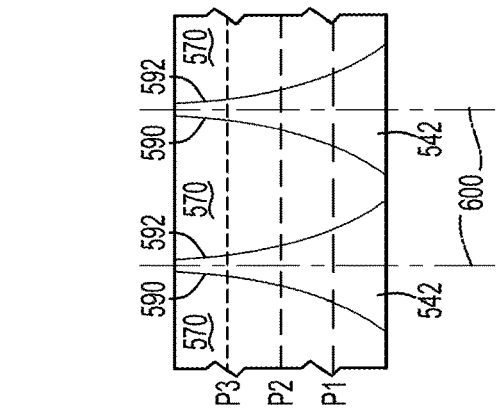 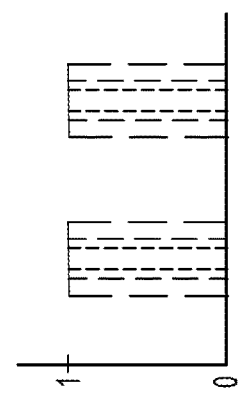
Fig-25A    Fig-25B
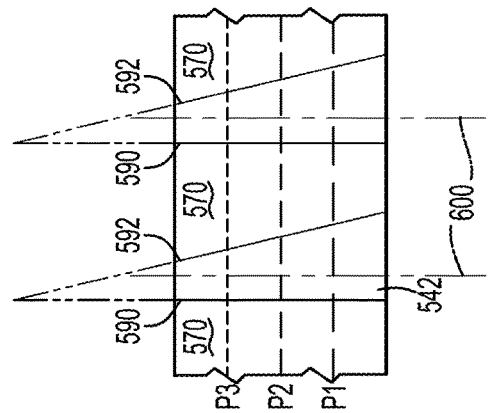 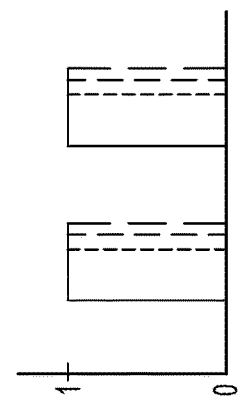
Fig-24A    Fig-24B
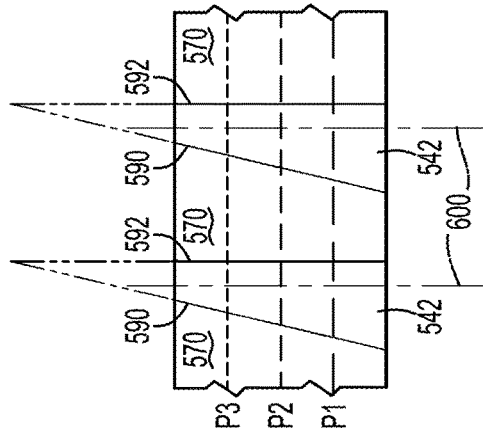 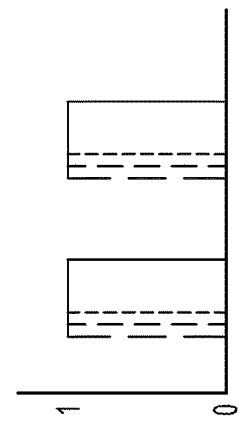
Fig-23A    Fig-23B
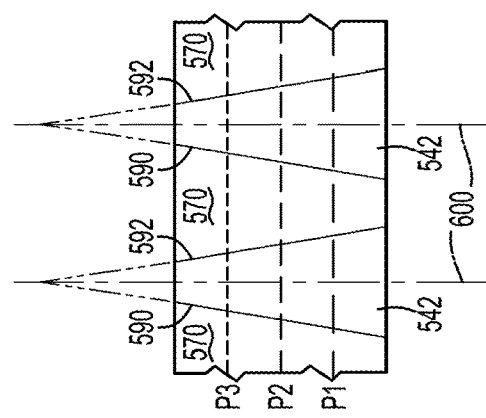 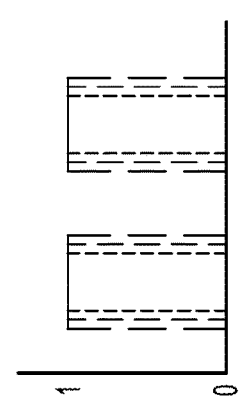
Fig-22A    Fig-22B

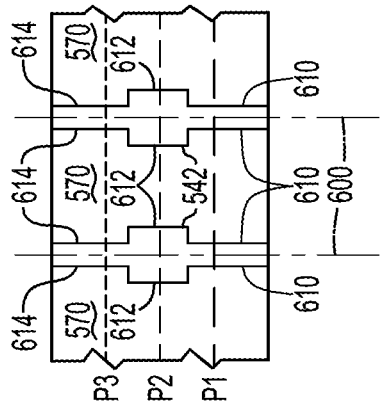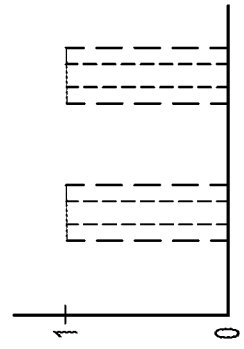
*Fig-27A*  *Fig-27B*
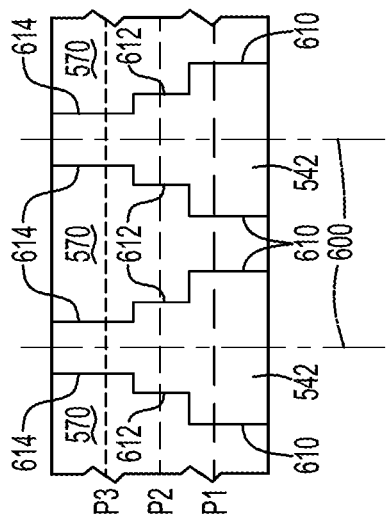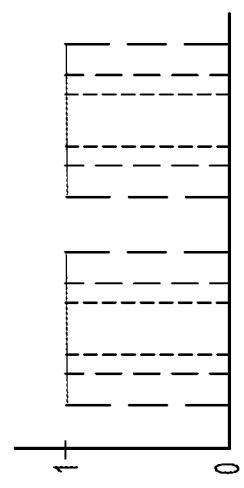
*Fig-26A*  *Fig-26B*

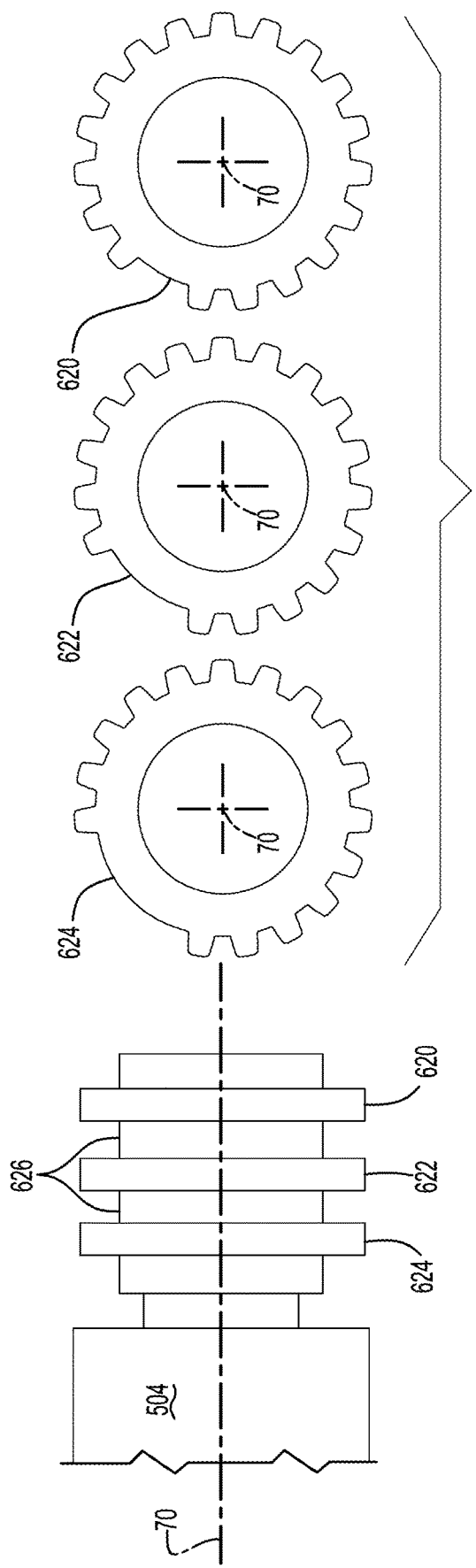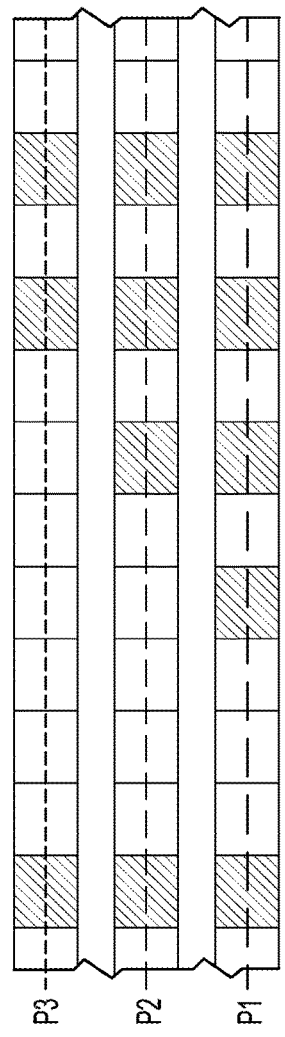
Fig-28A
Fig-28B
Fig-28C

US 11,124,054 B1

AXLE ASSEMBLY HAVING A SENSOR FOR DETECTING A SHIFT COLLAR

TECHNICAL FIELD

This document relates to an axle assembly that may have a sensor that may provide a signal that may be indicative of rotation of the shift collar about an axis and positioning of the shift collar along the axis.

BACKGROUND

An axle assembly having a clutch collar is disclosed in U.S. Pat. No. 9,719,563.

SUMMARY

In at least one embodiment, an axle assembly is provided. The axle assembly may include an electric motor module, a gear reduction module, a drive pinion, and a sensor. The gear reduction module may be operatively connected to the electric motor module. The drive pinion may be rotatable about a first axis. The shift collar may be rotatable with the drive pinion about the first axis and moveable along the first axis such that the shift collar is selectively couplable to the gear reduction module. The shift collar may have a set of detection features may be arranged around the first axis such that a gap is provided between adjacent detection features. The sensor may be configured to detect the set of detection features and provide a signal indicative of rotation of the shift collar about the first axis. A duty cycle of the signal may vary as the shift collar moves along the first axis and may be indicative of positioning of the shift collar along the first axis.

In at least one embodiment, an axle assembly is provided. The axle assembly may include an electric motor module, a gear reduction module, a drive pinion, and a sensor. The gear reduction module may be operatively connected to the electric motor module. The gear reduction module may include a planetary gear set that may have a sun gear that may be operatively connected to the electric motor module, a planetary ring gear, a planet gear that meshes with the sun gear and the planetary ring gear, and a planet gear carrier that rotatably supports the planet gear. The drive pinion may be rotatable about a first axis. The shift collar may be rotatable with the drive pinion about the first axis and moveable along the first axis such that the shift collar is selectively couplable to the sun gear or the planet gear carrier. The shift collar may have a first toothed ring, a second toothed ring, and a third toothed ring. The first toothed ring, the second toothed ring, and the third toothed ring may have different numbers of teeth. The sensor may be configured to detect teeth of the first toothed ring, the second toothed ring, or the third toothed ring and provide a signal indicative of rotation of the shift collar about the first axis and positioning of the shift collar along the first axis.

BRIEF DESCRIPTION OF THE DRAWINGS

FIG. 22A through FIG. 27B illustrate examples of detection features that may be provided with the shift collar in the figures ending with A and examples of associated signal plots when the shift collar is in the first, second, and third positions in the figures ending with B.

FIG. 28A is an illustration of a shift collar having axially arranged detection features.

FIG. 28B is a side view showing of the detection features of FIG. 28A.

FIG. 28C is an example of a signal plot associated with the detection features of FIGS. 28A and 28B.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
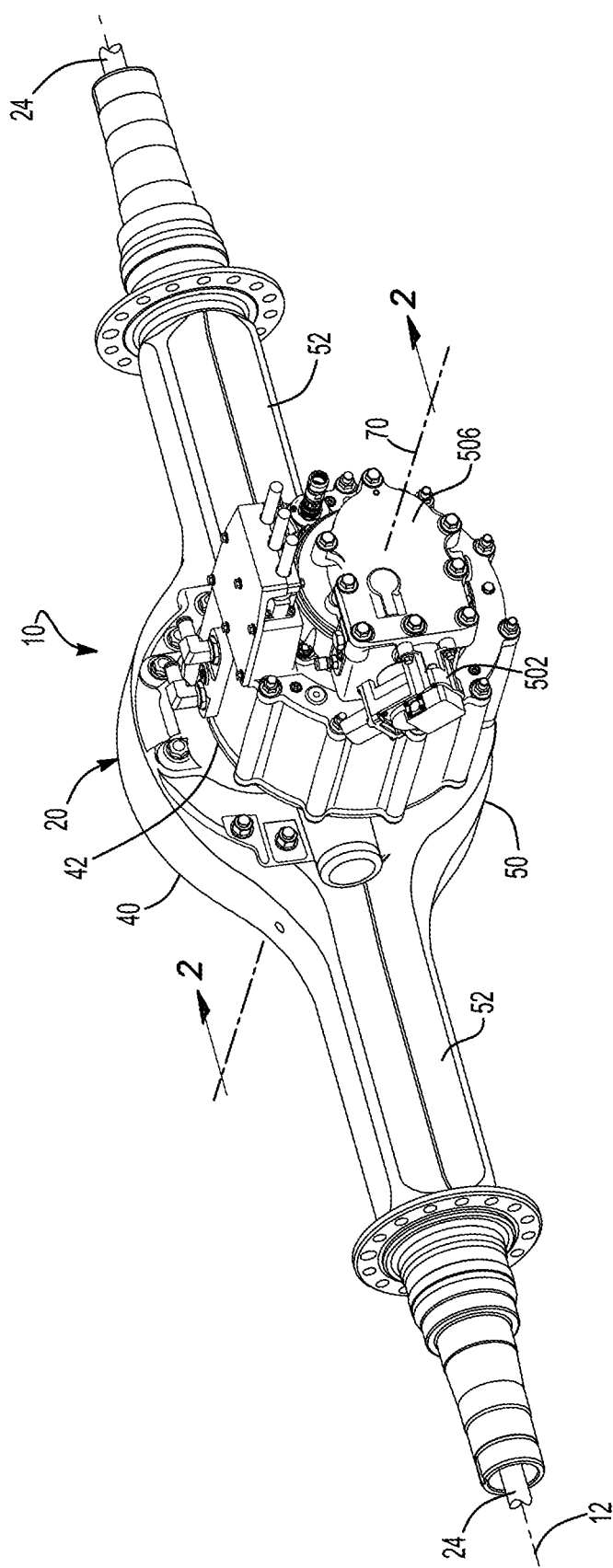
FIG. 1 is a perspective view of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis 12.

One or more axle assemblies may be provided with the vehicle. As is best shown with reference to FIGS. 1 and 2, the axle assembly 10 may include a housing assembly 20, a differential assembly 22, at least one axle shaft 24, a drive pinion 26, an electric motor module 28, a gear reduction module 30, and a shift mechanism 32.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one embodiment, the axle housing 40 may include a center portion 50 and at least one arm portion 52.

Figure 2:
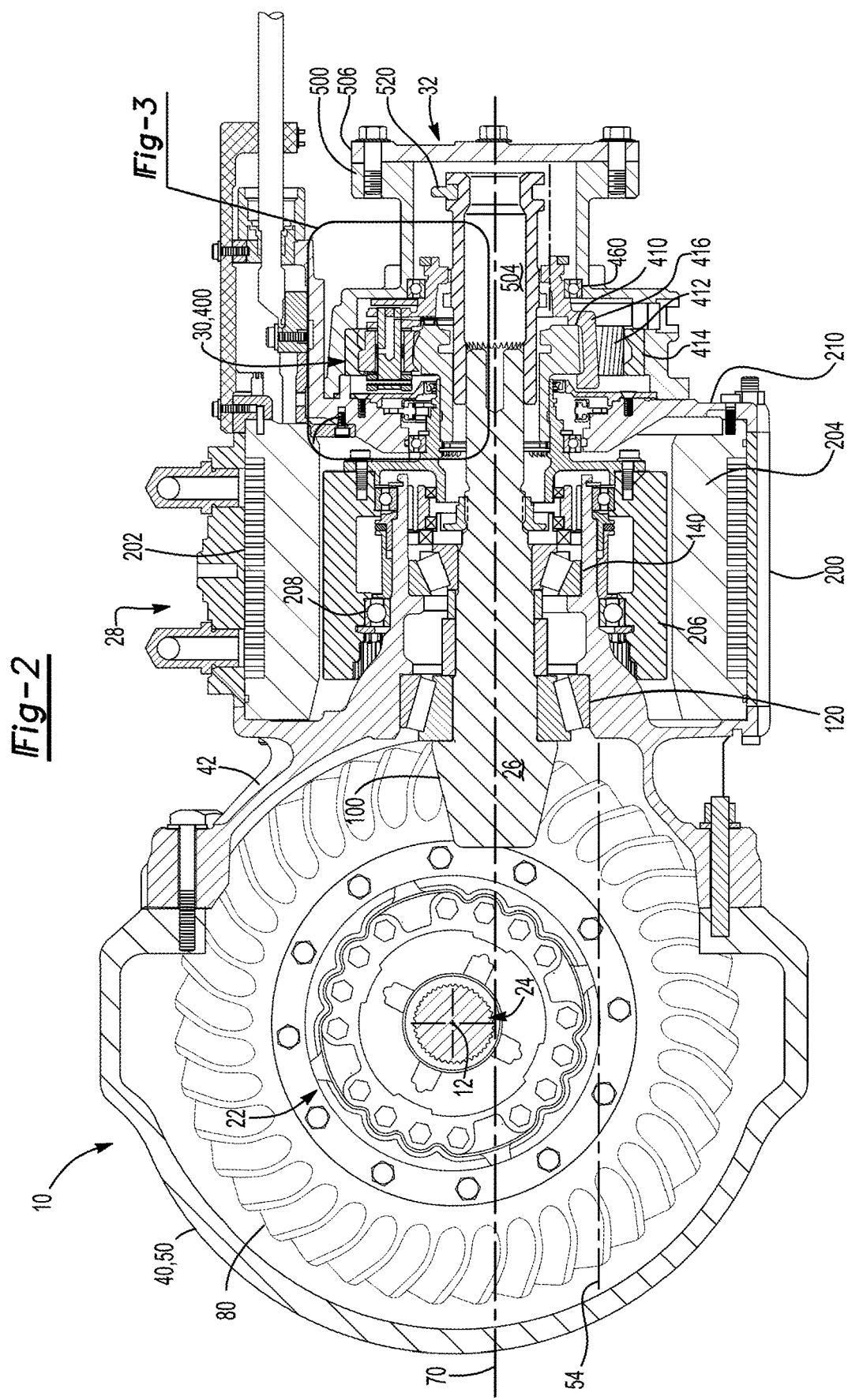
FIG. 2 is a section view of the axle assembly along section line 2-2 showing a shift collar in a first position.

Referring to FIGS. 1 and 2, the center portion 50 may be disposed proximate the center of the axle housing 40. The center portion 50 may define a cavity that may receive the differential assembly 22. As is best shown in FIG. 2, a lower region of the center portion 50 may at least partially define a sump portion that may contain lubricant 54. Splashed lubricant may flow down the sides of the center portion 50 and may flow over various internal components of the axle assembly 10 and gather in the sump portion.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. An arm portion may rotatably support an associated wheel hub. It is also contemplated that the arm portions 52 may be omitted.

Figure 6:
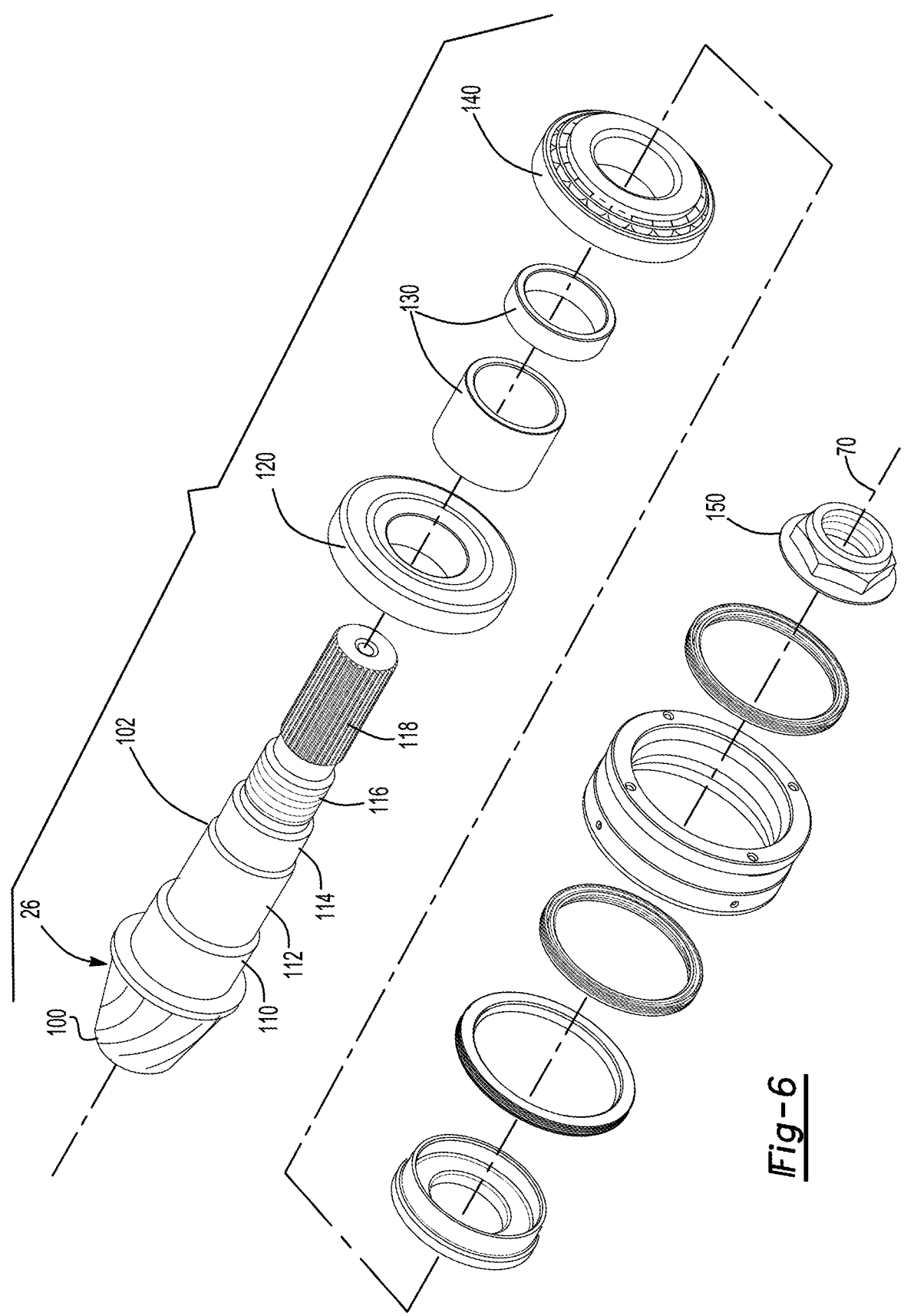
Figure 13:
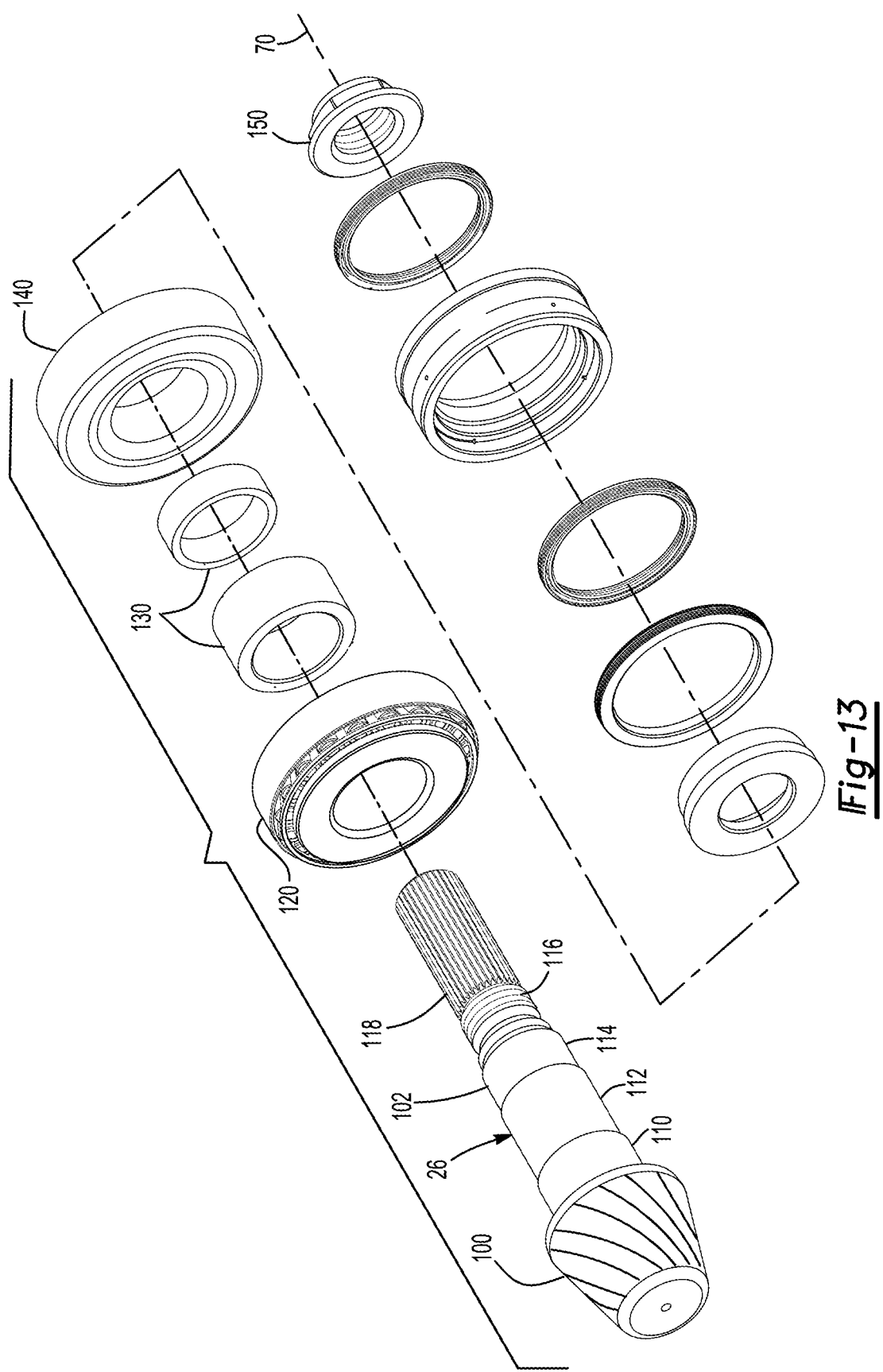

Referring to FIGS. 1 and 2, the differential carrier 42 may be mounted to the center portion 50 of the axle housing 40. The differential carrier 42 may support the differential assembly 22 and may facilitate mounting of the electric motor module 28. As is best shown with reference to FIGS. 2, 6 and 13, the differential carrier 42 may include one or more bearing supports 60, a mounting flange 62, and a bearing support wall 64.

Figure 4:
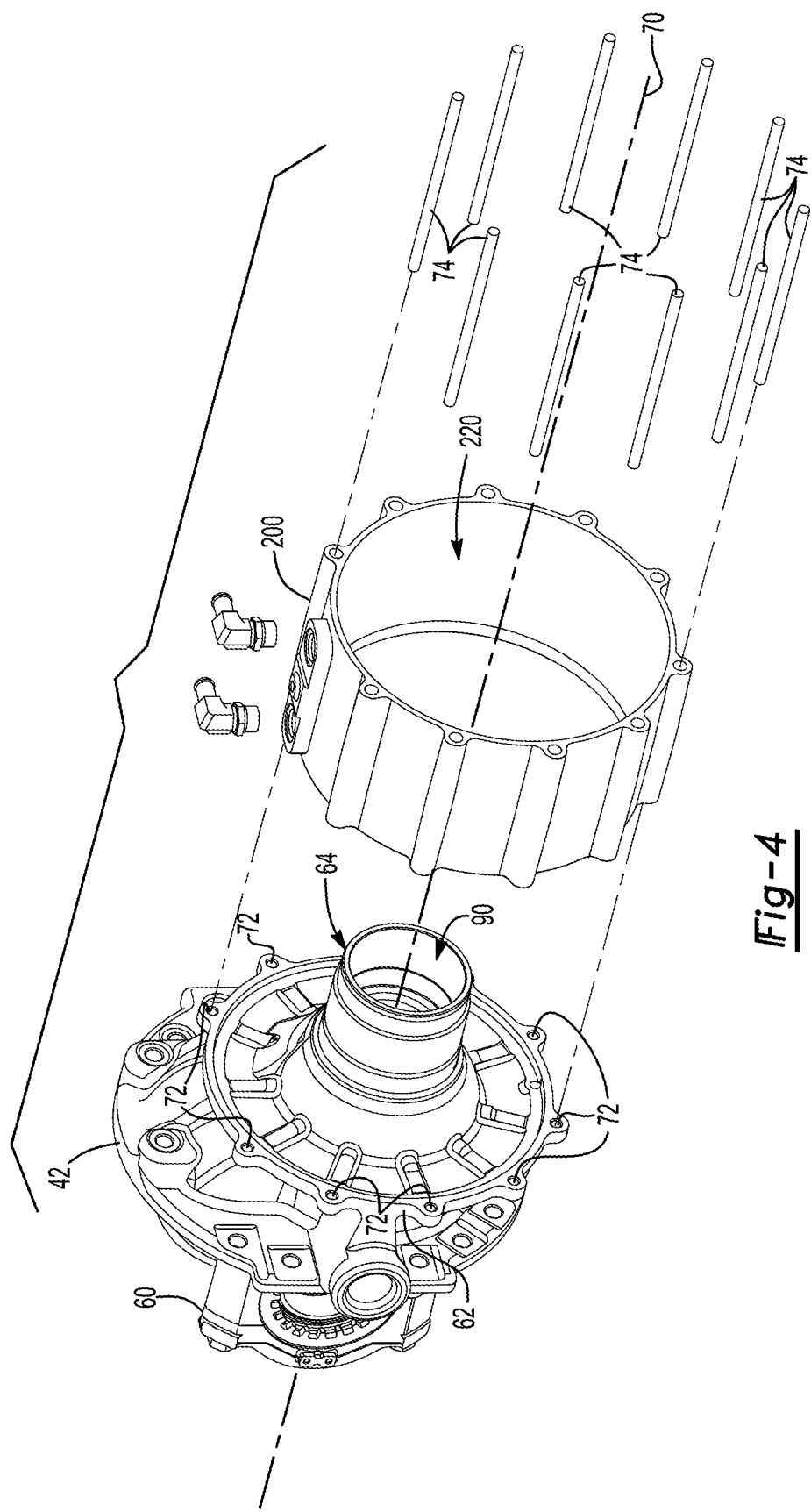
FIGS. 4-17 are exploded views of the axle assembly.
Figure 11:
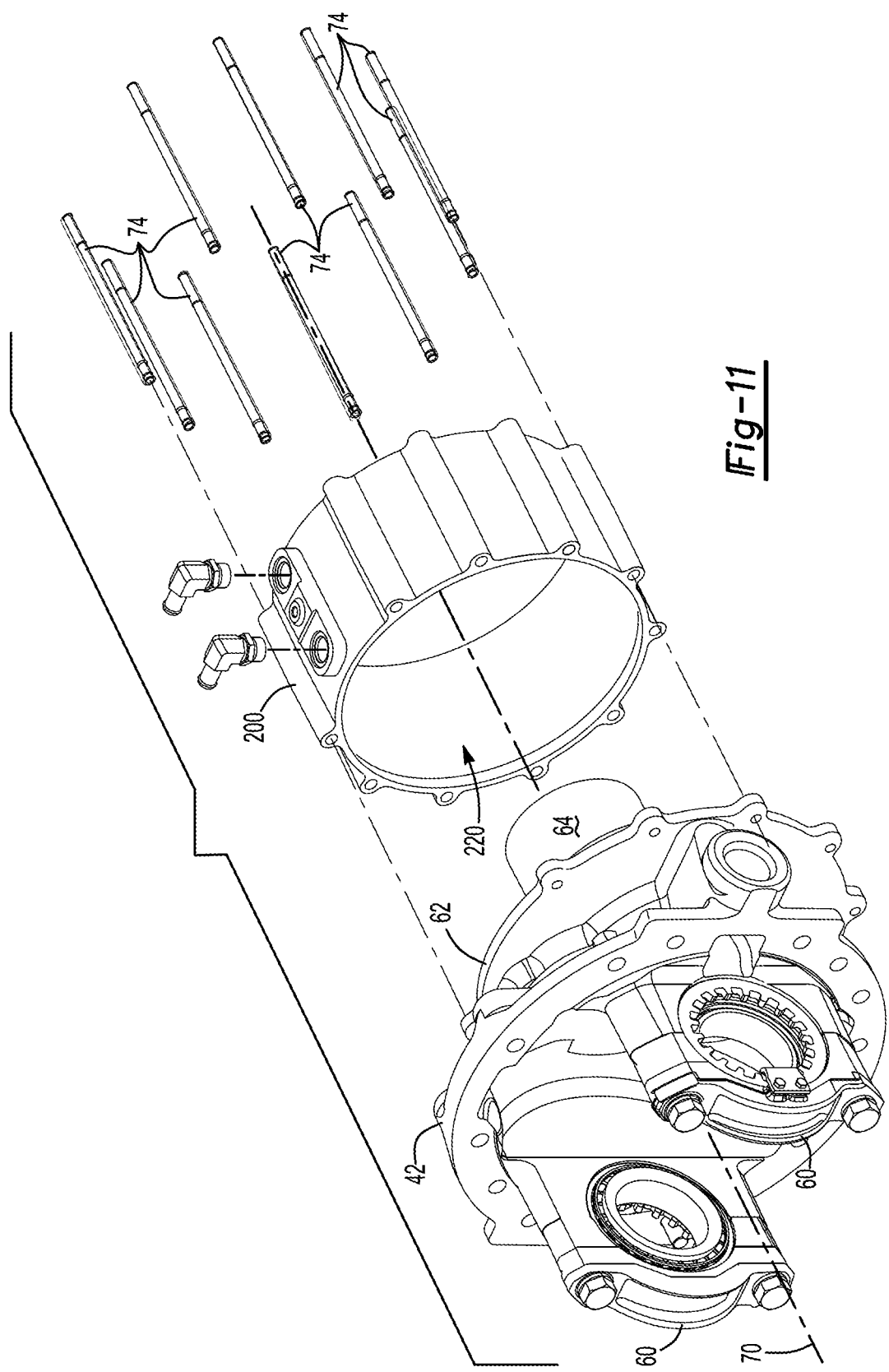

Referring to FIGS. 4 and 11, the bearing support 60 may support a roller bearing assembly that may rotatably support the differential assembly 22. For example, two bearing supports 60 may be received in the center portion 50 and may be located proximate opposite sides of the differential assembly 22.

The mounting flange 62 may facilitate mounting of the electric motor module 28. The mounting flange 62 may be configured as a ring that may extend outward and away from a first axis 70 and may extend around the first axis 70. The mounting flange 62 may include a set of fastener holes 72. Each fastener hole 72 may be configured to receive a fastener 74 that may secure the electric motor module 28 to the mounting flange 62.

Referring to FIGS. 2 and 4, the bearing support wall 64 may support bearings that may rotatably support other components of the axle assembly 10. For example, the bearing support wall 64 may support a bearing that may rotatably support the drive pinion 26, a bearing that may rotatably support a rotor of the electric motor module 28, or both. The bearing support wall 64 may extend in an axial direction away from the axle housing 40 and may extend around the first axis 70. As such, the bearing support wall 64 may define a hole that may receive the drive pinion 26 and various other components as will be discussed in more detail below. In addition, the bearing support wall 64 may be radially positioned between the first axis 70 and the electric motor module 28. The bearing support wall 64 may be integrally formed with the differential carrier 42 or may be a separate component that is fastened to the differential carrier 42.

Differential Assembly and Axle Shafts

Referring to FIG. 2, the differential assembly 22 may be at least partially received in the center portion 50 of the housing assembly 20. The differential assembly 22 may transmit torque to the axle shafts 24 and wheels and permit the axle shafts 24 and wheels to rotate at different velocities under various driving conditions. For instance, the differential assembly 22 may have a ring gear 80 that may engage and receive torque from the drive pinion 26, may be operatively connected to the axle shafts 24, and may transmit torque to the axle shafts 24 in a manner known by those skilled in the art. The differential assembly 22 and the ring gear 80 may be rotatable about an axis such as the wheel axis 12 or an axis that may be disposed substantially parallel to the wheel axis 12.

Referring to FIGS. 1 and 2, the axle shafts 24 may transmit torque from the differential assembly 22 to corresponding wheel hubs and wheels. For example, two axle shafts 24 may be provided such that each axle shaft 24 may extend through a different arm portion 52 of axle housing 40. The axle shafts 24 may extend along and may be rotated about the wheel axis 12 by the differential assembly 22. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Drive Pinion

Referring to FIG. 2, the drive pinion 26 may provide torque to the ring gear 80 of the differential assembly 22. The drive pinion 26 may also operatively connect a planetary gear set of the gear reduction module 30 to the differential assembly 22 as will be discussed in more detail below. The drive pinion 26 may extend along and may be rotatable about the first axis 70. In addition, the drive pinion 26 may extend through the hole in the bearing support wall 64 and through a hole in a motor cover as will be discussed in more detail below. In at least one configuration, such as is best shown with reference to FIGS. 2, 6 and 13, the drive pinion 26 may include a gear portion 100 and a shaft portion 102.

The gear portion 100 may be disposed at or near an end of the shaft portion 102. The gear portion 100 may have a plurality of teeth that may mesh with or mate with corresponding teeth on the ring gear 80. The gear portion 100 may be integrally formed with the shaft portion 102 or may be provided as a separate component that may be fixedly disposed on the shaft portion 102.

The shaft portion 102 may extend from the gear portion 100 in a direction that extends away from the axle housing 40. As is best shown with reference to FIGS. 6 and 13, the shaft portion 102 may include a first outer surface 110, a second outer surface 112, a third outer surface 114, a threaded portion 116, and a spline 118.

The first outer surface 110 may be disposed proximate the gear portion 100 and may be an outside circumference of a portion of the shaft portion 102. A first drive pinion bearing 120 may be disposed on the first outer surface 110 and may rotatably support the drive pinion 26. The first drive pinion bearing 120 may have any suitable configuration. For instance, the first drive pinion bearing 120 may be configured as a roller bearing assembly that may include a plurality of rolling elements that may be disposed between an inner race and an outer race. The inner race may extend around and may be disposed on the first outer surface 110. The outer race may extend around the rolling elements and may be disposed on the bearing support wall 64 of the differential carrier 42 and may be received in the hole of the bearing support wall 64.

The second outer surface 112 may be axially positioned between the first outer surface 110 and the third outer surface 114. The second outer surface 112 may be an outside circumference of a portion of the shaft portion 102 and may have a smaller diameter than the first outer surface 110. One or more spacer rings 130 may be disposed on the second outer surface 112. The spacer rings 130 may be disposed between the inner races of the drive pinion bearings to inhibit axial movement of the drive pinion bearings toward each other.

The third outer surface 114 may be axially positioned between the second outer surface 112 and the threaded portion 116. The third outer surface 114 may be an outside circumference of a portion of the shaft portion 102 and may have a smaller diameter than the second outer surface 112. A second drive pinion bearing 140 may be disposed on the third outer surface 114 and may rotatably support the drive pinion 26. The second drive pinion bearing 140 may have any suitable configuration. For instance, the second drive pinion bearing 140 may be configured as a roller bearing assembly that may include a plurality of rolling elements that may be disposed between an inner race and an outer race. The inner race may extend around and may be disposed on the third outer surface 114. The outer race may extend around the rolling elements, may be disposed on the bearing support wall 64 of the differential carrier 42, and may be received in the hole of the bearing support wall 64.

The threaded portion 116 may be axially positioned between the third outer surface 114 and the spline 118. The threaded portion 116 may facilitate installation of a preload nut 150.

The preload nut 150 may be threaded onto the threaded portion 116 and may apply a preload force on the first drive pinion bearing 120, the second drive pinion bearing 140, or both.

The spline 118 may be disposed between the threaded portion 116 and an end of the shaft portion 102 that may be disposed opposite the gear portion 100. The spline 118 may include a plurality of teeth. The teeth may be disposed substantially parallel to the first axis 70 and may mate with a corresponding spline on a shift collar of the shift mechanism 32 as will be discussed in more detail below.

Electric Motor Module

Referring to FIG. 2, the electric motor module 28 may be mounted to the differential carrier 42 and may provide torque to the differential assembly 22 via the drive pinion 26. The electric motor module 28 may be primarily disposed outside the differential carrier 42. In addition, the electric motor module 28 may be axially positioned between the axle housing 40 and the gear reduction module 30 and the axle housing 40. Main components of the electric motor module 28 are best shown with reference to FIGS. 4, 5, 8, 11, 12 and 15. In at least one configuration, the electric motor module 28 may include a motor housing 200, a coolant jacket 202, a stator 204, a rotor 206, at least one rotor bearing assembly 208, and a motor cover 210.

Referring to FIGS. 2, 4, and 11, the motor housing 200 may extend between the differential carrier 42 and the motor cover 210. For example, the motor housing 200 may extend from the mounting flange 62 of the differential carrier 42 to the motor cover 210. The motor housing 200 may extend around a first axis 70 to define a motor housing cavity 220. The motor housing cavity 220 may have a generally cylindrical configuration. The motor housing 200 may extend continuously around and may be spaced apart from the bearing support wall 64 of the differential carrier 42.

Figure 5:
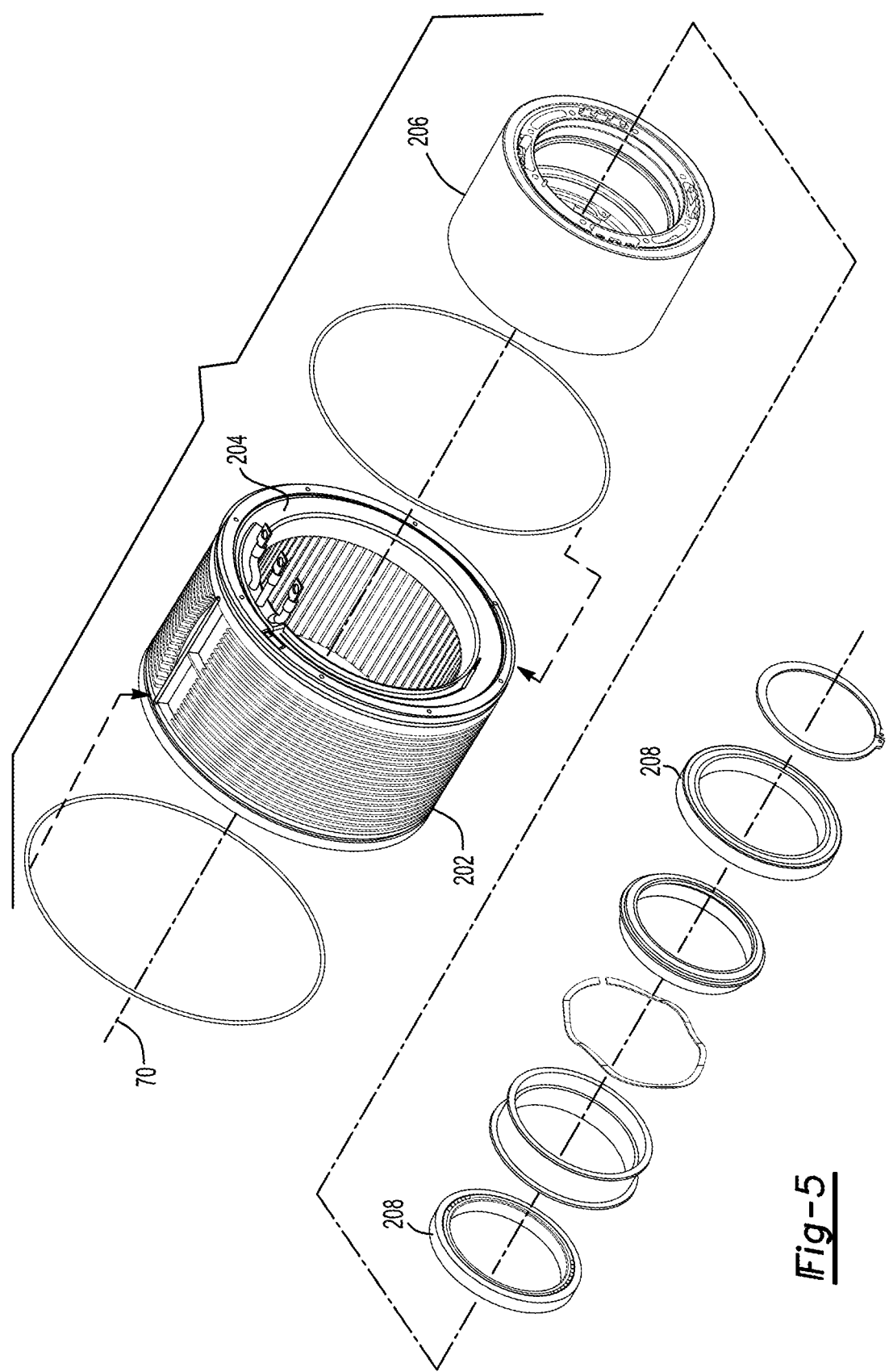
Figure 12:
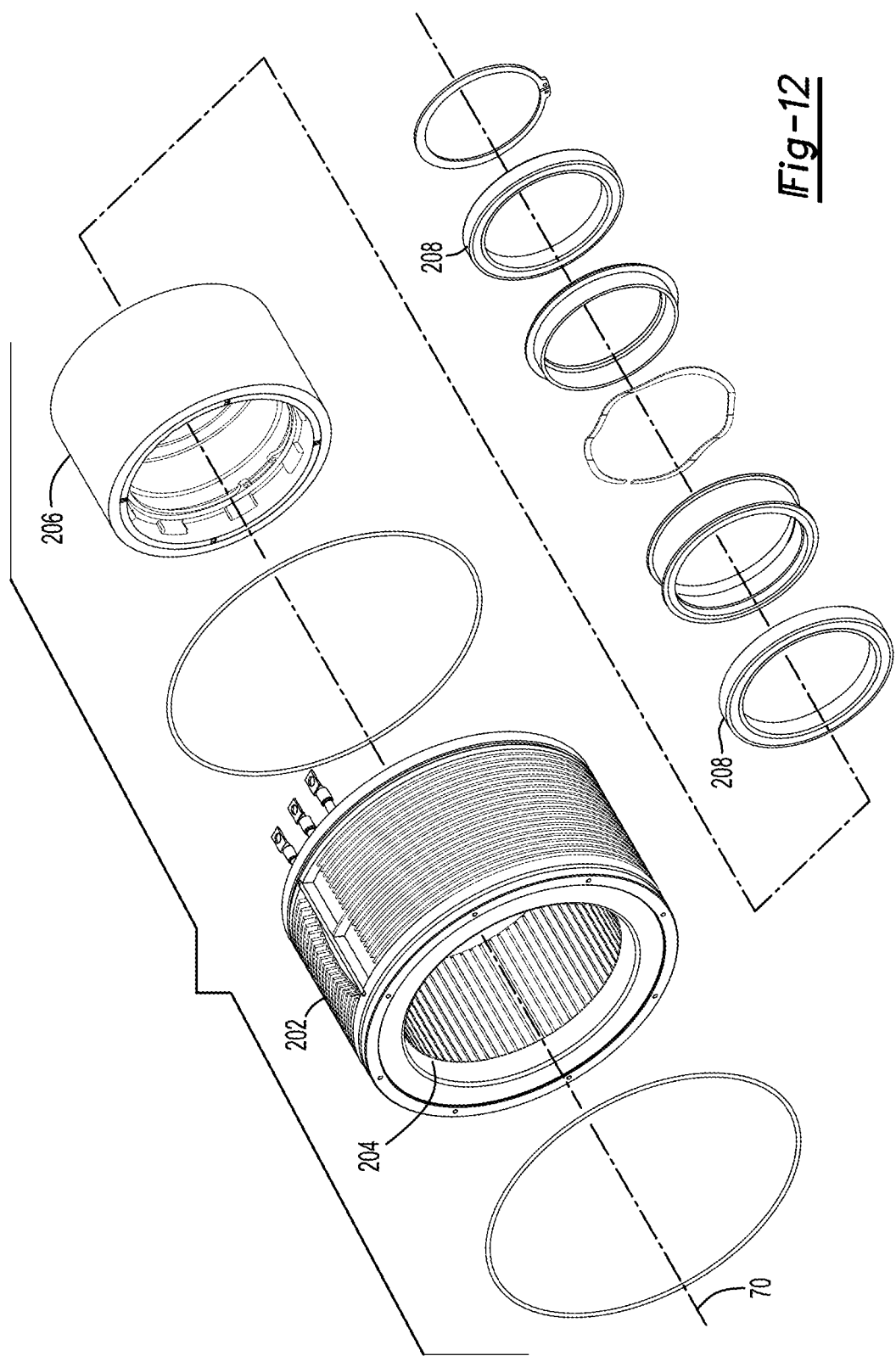

Referring to FIGS. 5 and 12, the coolant jacket 202 may facilitate the circulation of a cooling fluid to help cool or remove heat from the stator 204. The coolant jacket 202 may be received in the motor housing cavity 220 and may engage the interior surface of the motor housing 200. The coolant jacket 202 may extend axially between the differential carrier 42 and the motor cover 210. The coolant jacket 202 may receive the stator 204.

The stator 204 may be fixedly positioned with respect to the coolant jacket 202. For example, the stator 204 may extend around the first axis 70 and may include stator windings that may be received inside and may be fixedly positioned with respect to the coolant jacket 202.

Referring to FIGS. 2, 5 and 12, the rotor 206 may extend around the first axis 70 and may be received inside the stator 204 and the motor housing 200. The rotor 206 may be rotatable about the first axis 70 with respect to the differential carrier 42 and the stator 204. The rotor 206 may be spaced apart from the stator 204 but may be disposed close to the stator 204. The rotor 206 may include magnets or ferromagnetic material that may facilitate the generation of electrical current. The rotor 206 may extend around and may be supported by the bearing support wall 64. The rotor 206 may be operatively connected to the drive pinion 26 between the end of the bearing support wall 64 and the motor cover 210, such as with a rotor output flange 230 as will be discussed in more detail below.

At least one rotor bearing assembly 208 may rotatably support the rotor 206. The rotor bearing assembly 208 may receive the bearing support wall 64 of the differential carrier 42 and may be received inside of the rotor 206. The rotor bearing assembly 208 may have any suitable configuration. For instance, the rotor bearing assembly 208 may include a plurality of rolling elements that may be disposed between an inner race and an outer race. The inner race may extend around and may receive the bearing support wall 64 of the differential carrier 42. The outer race may extend around the rolling elements and may be disposed on the rotor 206.

Figure 8:
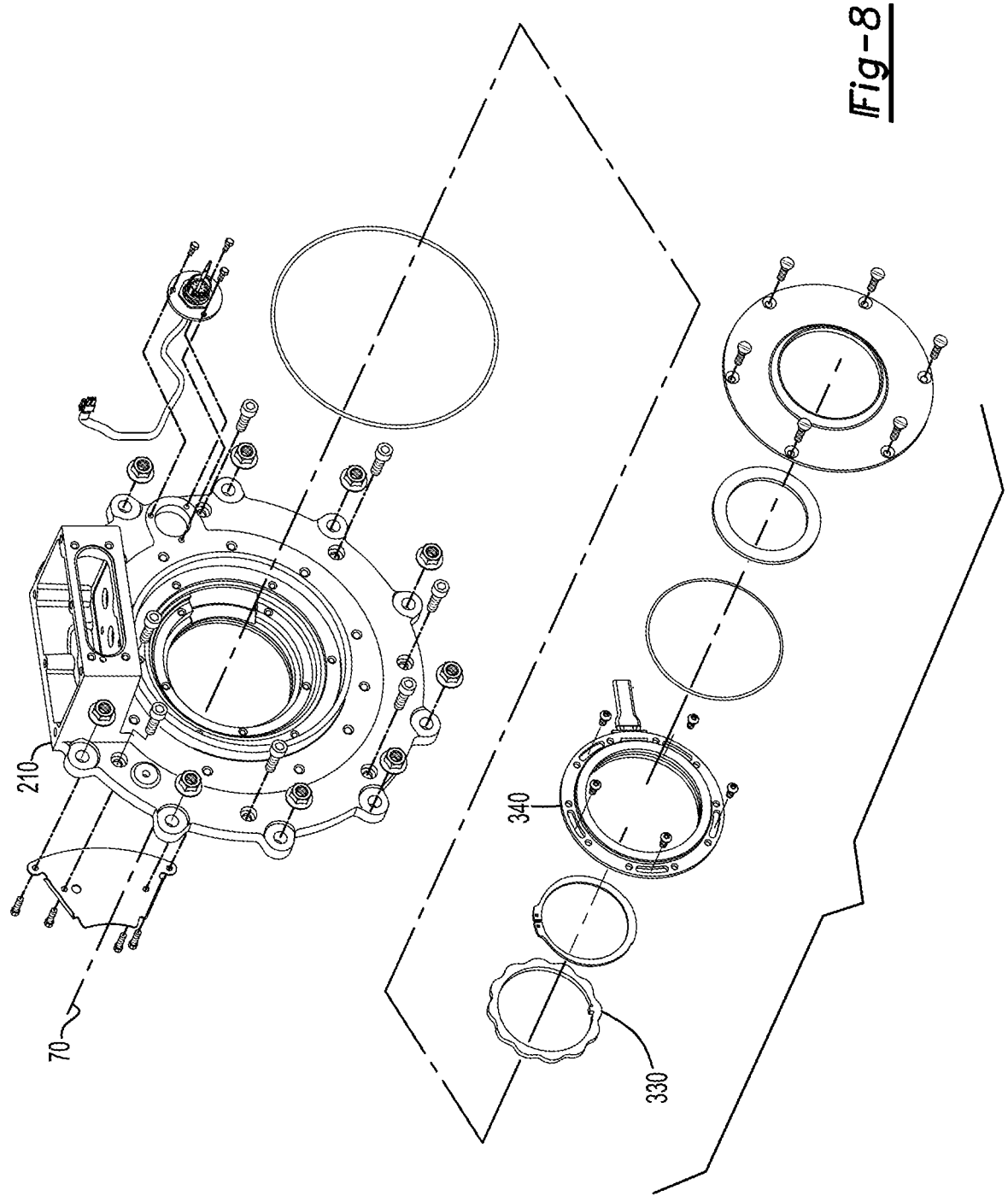
Figure 15:
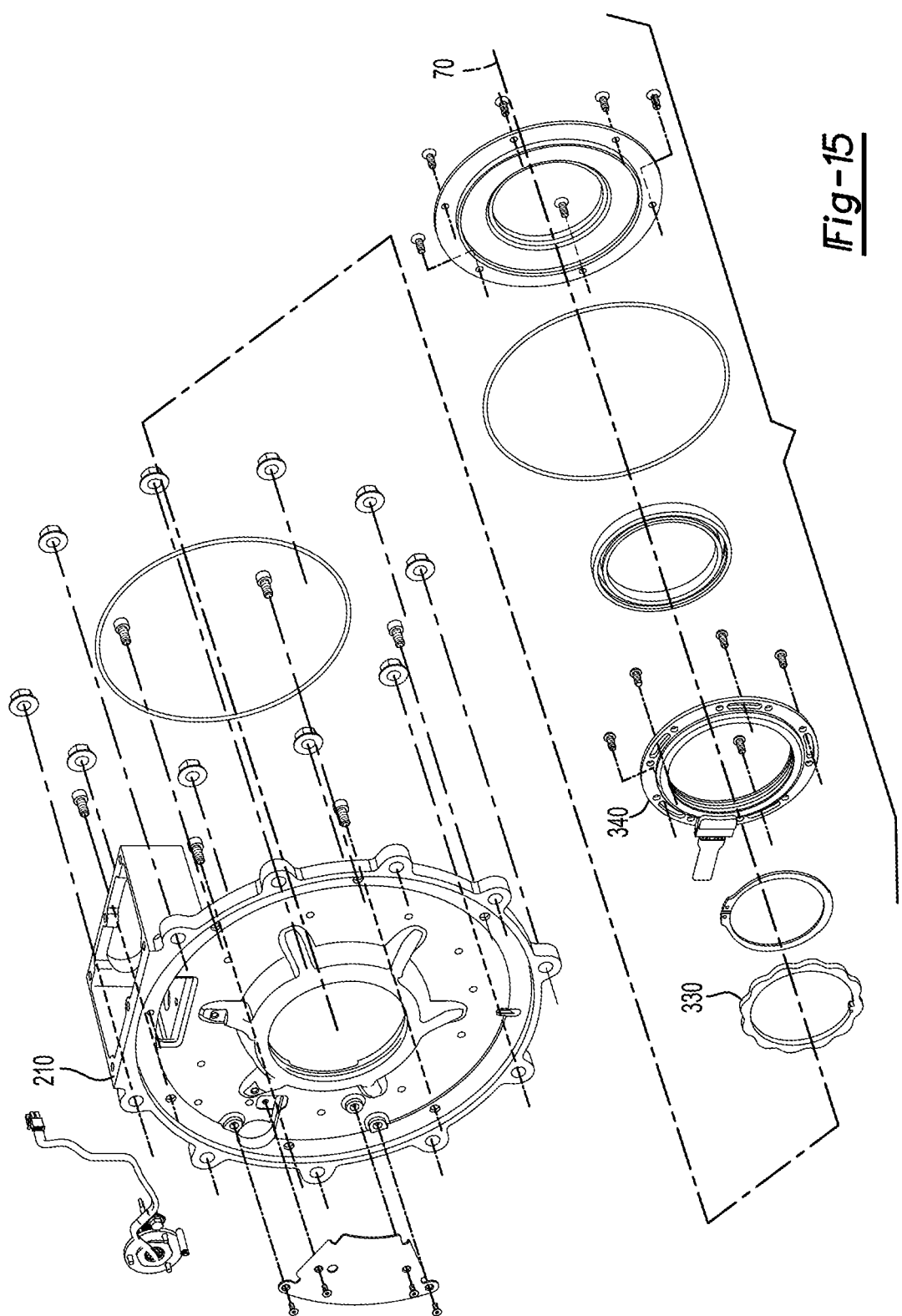

Referring to FIGS. 2, 8 and 15, the motor cover 210 may be mounted to the motor housing 200 and may be disposed opposite the axle housing 40. For example, the motor cover 210 may be mounted to an end of the motor housing 200 that may face away from the differential carrier 42. The motor cover 210 may be provided in various configurations. In at least one configuration, the motor cover 210 may define a motor cover opening that may be a through hole that may extend around the first axis 70.

Rotor Output Flange

Figure 3:
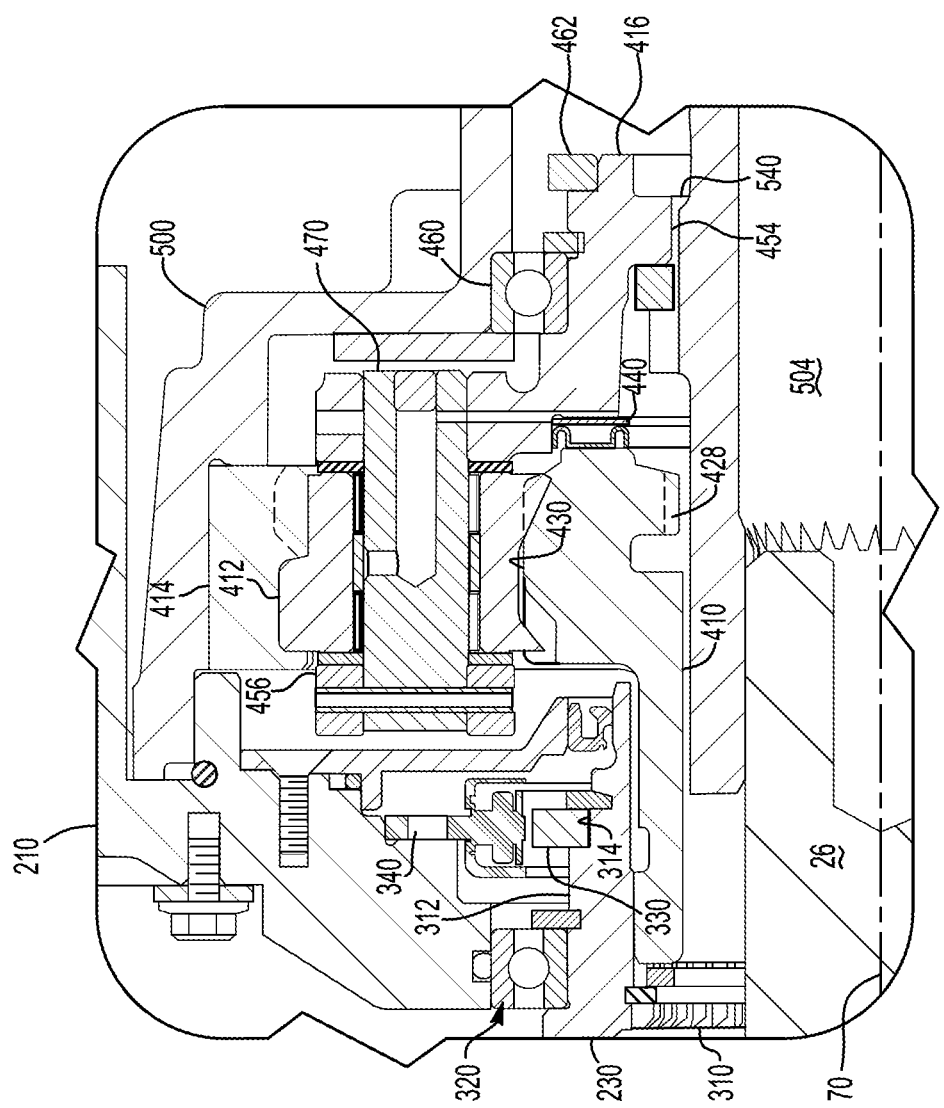
FIG. 3 is a magnified view of a portion of FIG. 2.
Figure 7:
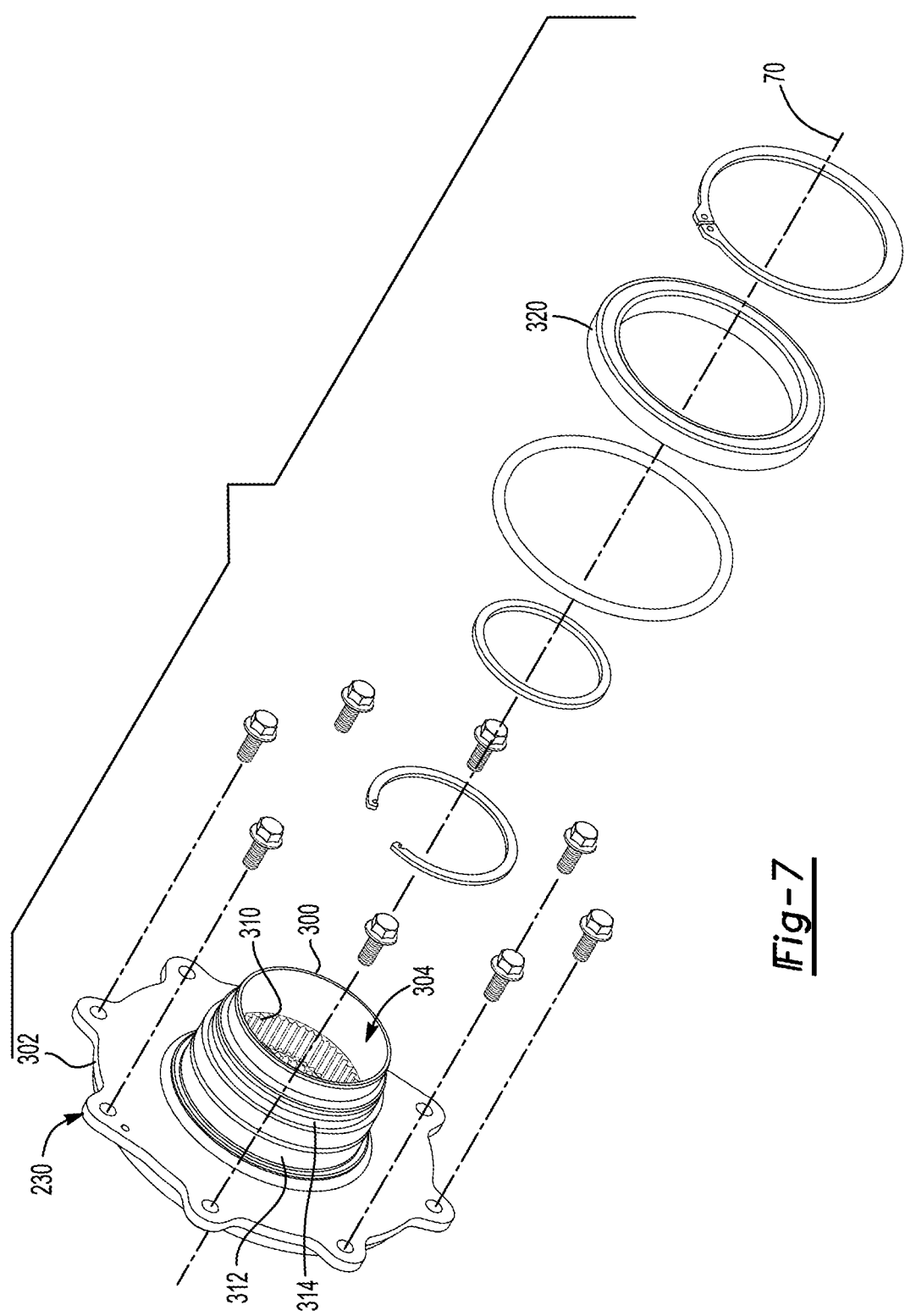
Figure 14:
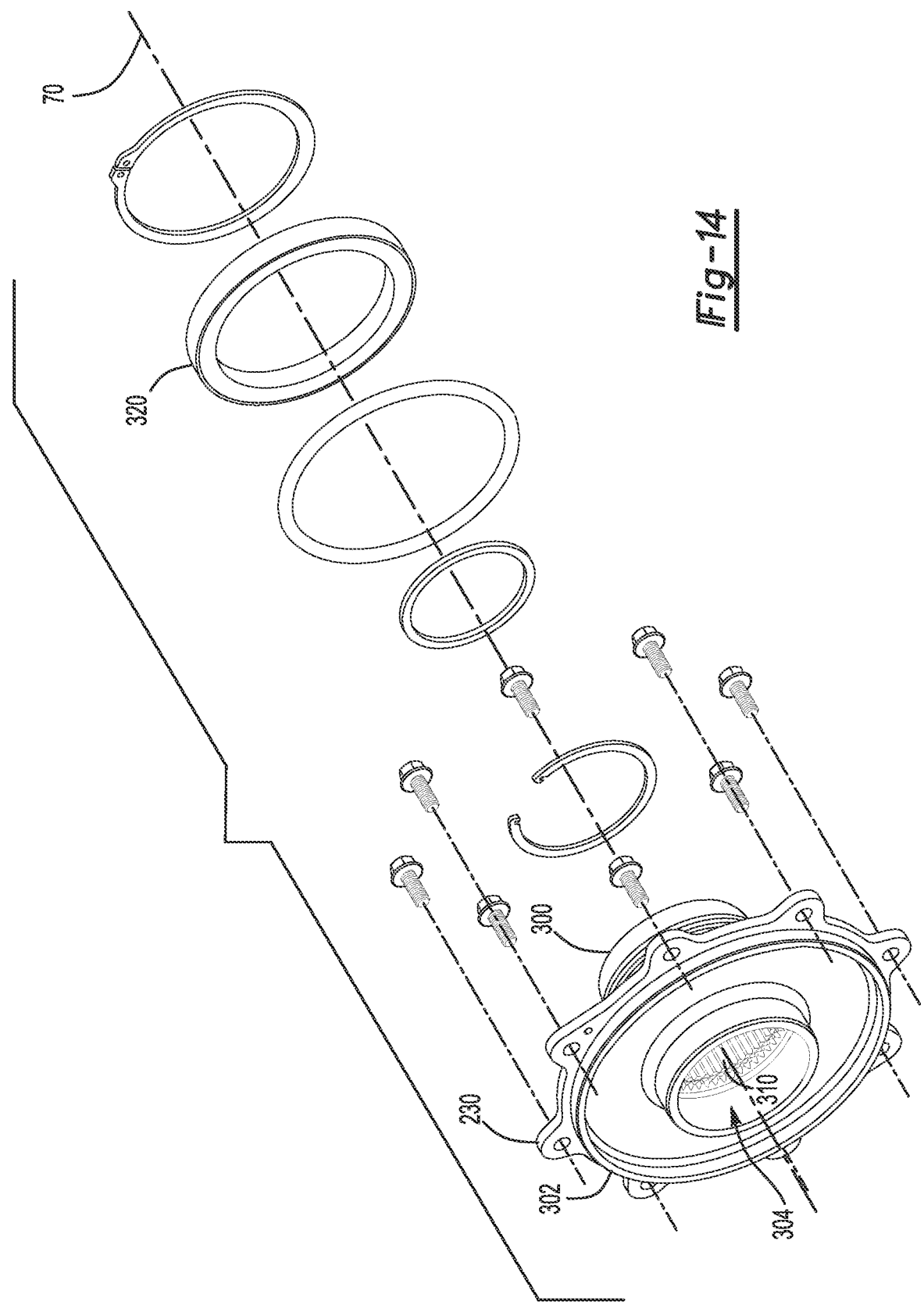

Referring to FIGS. 3, 7 and 14, the rotor output flange 230 may operatively connect or couple the electric motor module 28 to the gear reduction module 30. For example, the rotor output flange 230 may couple the rotor 206 to a sun gear 410 of the gear reduction module 30 as will be discussed in more detail below. The rotor output flange 230 may be fixedly coupled to or fixedly mounted to the rotor 206. As such, the rotor output flange 230 may rotate about the first axis 70 with the rotor 206. In addition, the rotor output flange 230 may extend through the motor cover opening of the motor cover 210. In at least one configuration, the rotor output flange 230 may include a tubular body 300 and a flange portion 302.

The tubular body 300 may extend around the first axis 70 and may define a rotor output flange hole 304. The rotor output flange hole 304 may be a through hole that may extend along and may be centered about the first axis 70. The drive pinion 26 may extend through the rotor output flange hole 304 and may be spaced apart from the rotor output flange 230. As is best shown in FIG. 3, the sun gear 410 of the gear reduction module 30 may be partially received in the rotor output flange 230 and hence may be partially received in the rotor output flange hole 304. In at least one configuration, the tubular body 300 may include a rotor output flange spline 310, a spigot bearing support surface 312, and a rotary disc support surface 314.

The rotor output flange spline 310 may be disposed in the rotor output flange hole 304. The rotor output flange spline 310 may have teeth that may be arranged around the first axis 70 and may extend toward the first axis 70. The teeth of the rotor output flange spline 310 may mate with a spline of the sun gear 410 such that the rotor output flange 230 may rotate about the first axis 70 with the sun gear 410 and the rotor 206.

The spigot bearing support surface 312 may be axially positioned between the flange portion 302 and the second end of the tubular body 300. Referring to FIGS. 3, 7 and 14, the spigot bearing support surface 312 may be configured to support a spigot bearing assembly 320. the spigot bearing assembly 320 may receive the rotor output flange 230 and may rotatably support the rotor output flange 230. The spigot bearing assembly 320 may help inhibit deflection of the rotor 206, such as deflection with respect to the first axis 70. As such, the spigot bearing assembly 320 may help align or center the rotor 206 about the first axis 70 and may help improve the stability of the rotor 206 and maintain a desired air gap between the rotor 206 and the stator 204. The spigot bearing assembly 320 may be received inside the hole of the motor cover 210. In at least one configuration, the spigot bearing assembly 320 may extend between the motor cover 210 and the rotor output flange 230.

The rotary disc support surface 314 may be disposed opposite the rotor output flange hole 304 and may be axially positioned between the spigot bearing support surface 312 and the second end of the tubular body 300. The rotary disc support surface 314 may support a rotary disc 330, which may also be referred to as a resolver rotor.

Referring to FIGS. 3 and 8, the rotary disc 330 may be fixedly disposed on the rotor output flange 230. As such, the rotary disc 330 may rotate about the first axis 70 with the rotor 206. The rotary disc 330 may be axially positioned between the spigot bearing assembly 320 and the second end of the rotor output flange 230. As is best shown in FIG. 8, the rotary disc 330 may have a non-cylindrical outer surface that may face away from the first axis 70 that may include a plurality of protrusions that may extend away from the first axis 70. The protrusions may be arranged in a repeating pattern around the first axis 70.

The flange portion 302 may be disposed between the first end and the second end of the tubular body 300. The flange portion 302 may extend from the tubular body 300 in a direction that extends away from the first axis 70. The flange portion 302 may be fixedly coupled to the rotor 206. For instance, the flange portion 302 may include a set of holes that may be arranged around the first axis 70 and that may receive fasteners, such as bolts, that may extend through the holes to couple the flange portion 302 to the rotor 206.

Referring to FIGS. 3, 8 and 15, a first sensor 340 may be associated with the electric motor module 28. The first sensor 340, which may also be referred to as a resolver stator, may function as a sensor that may provide a signal indicative of rotation of the rotor 206 or the rotational position of the rotor 206. For example, the first sensor 340 may detect the position of the rotary disc 330, such as by detecting the presence or absence of the protrusions of the rotary disc 330 or may detect rotation of the rotary disc 330. The first sensor 340 may be of any suitable type. For example, the first sensor 340 may be an analog resolver or a digital resolver, such as a rotary encoder.

The first sensor 340 may generally be configured as a ring that may extend around the first axis 70. In at least one configuration, the first sensor 340 may be mounted to the motor cover 210. The first sensor 340 may be electrically connected to an electrical power source and a controller 350 or axle control module that may control operation of the electric motor module 28.

Gear Reduction Module

Referring to FIG. 2, the gear reduction module 30 may transmit torque from the electric motor module 28 to the differential assembly 22. As such, the gear reduction module 30 may be operatively connected to the electric motor module 28 and the differential assembly 22. The gear reduction module 30 may be disposed outside of the differential carrier 42 and may be primarily disposed outside of the electric motor module 28, thereby providing a modular construction that may be mounted to the electric motor module 28 when gear reduction is desired. Such a configuration may facilitate standardized configurations of the differential carrier 42 and/or the electric motor module 28.

The gear reduction module 30 may be disposed adjacent to the motor cover 210. In addition, the gear reduction module 30 may be at least partially received in a housing, such as a shift mechanism housing 500 that may be mounted to the motor cover 210.

Figure 18:
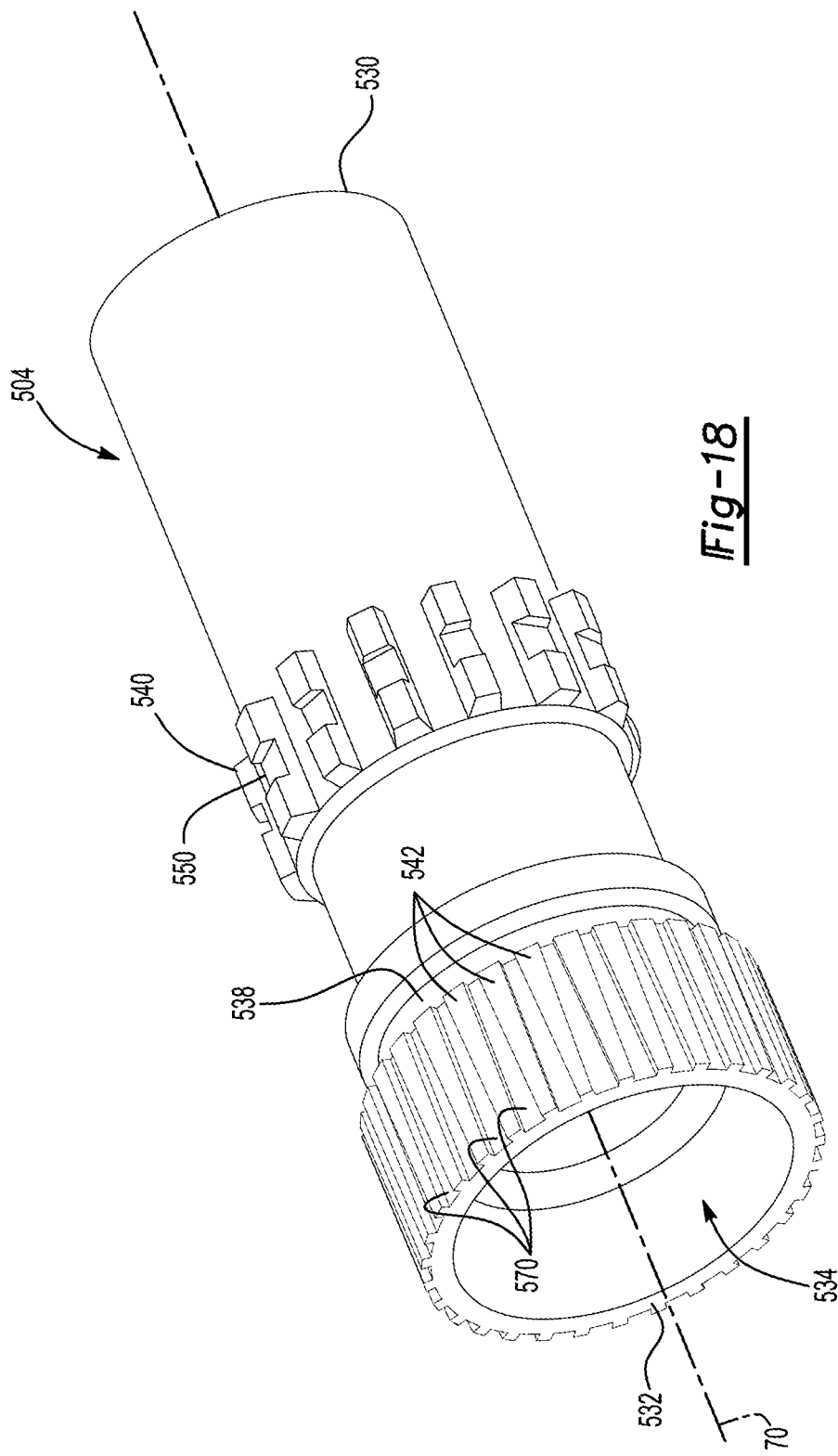
FIG. 18 is a perspective view of an example of a shift collar.

The gear reduction module 30 may be provided in various configurations, such as planetary gear set configurations and non-planetary gear set configurations. Referring to FIGS. 2, 11 and 18, an example of a gear reduction module 30 that has a planetary gear set 400 is shown. In such a configuration, the gear reduction module 30 may include a sun gear 410, planet gears 412, a planetary ring gear 414, and a planet gear carrier 416.

Figure 9:
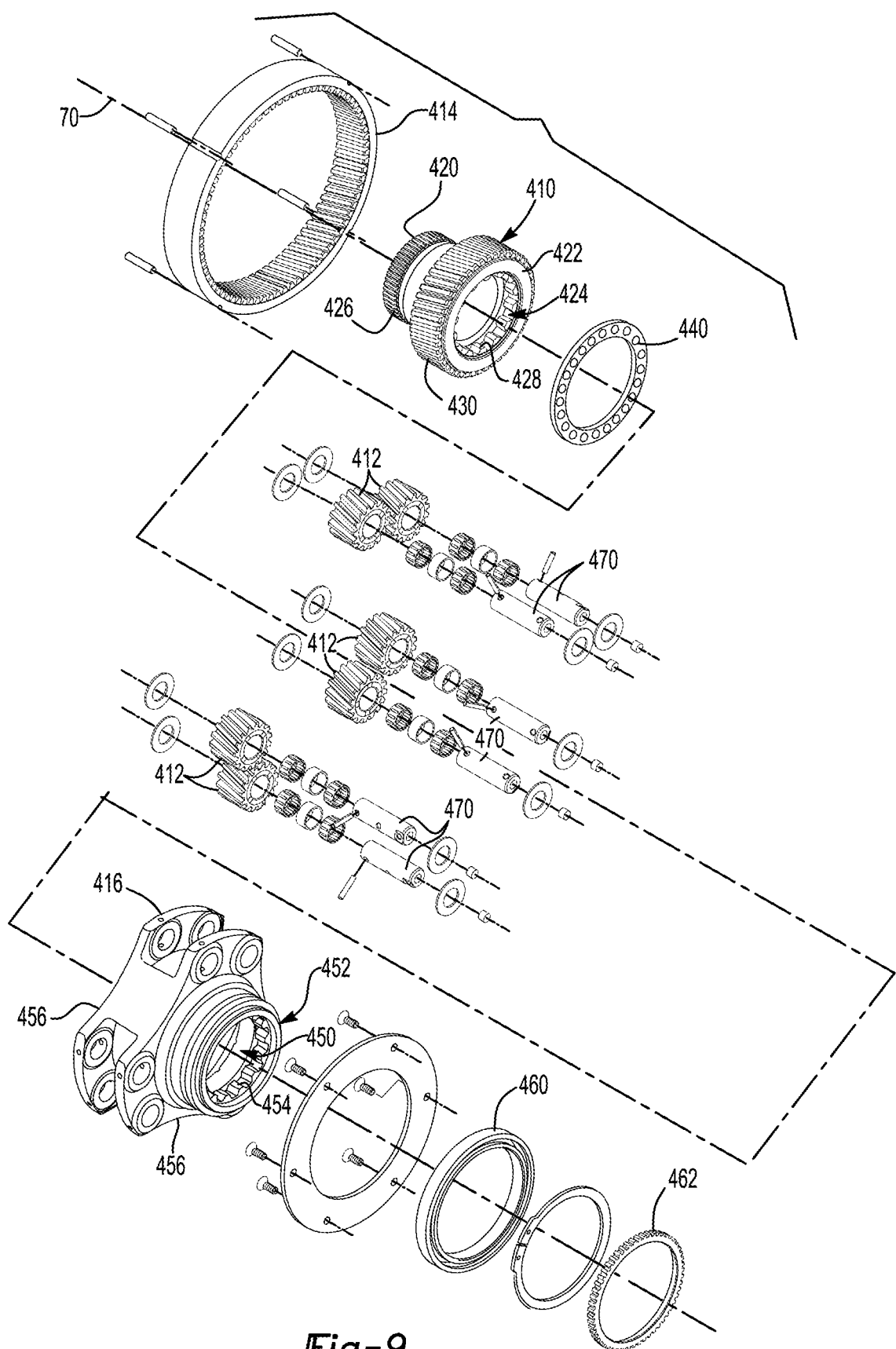
Figure 16:
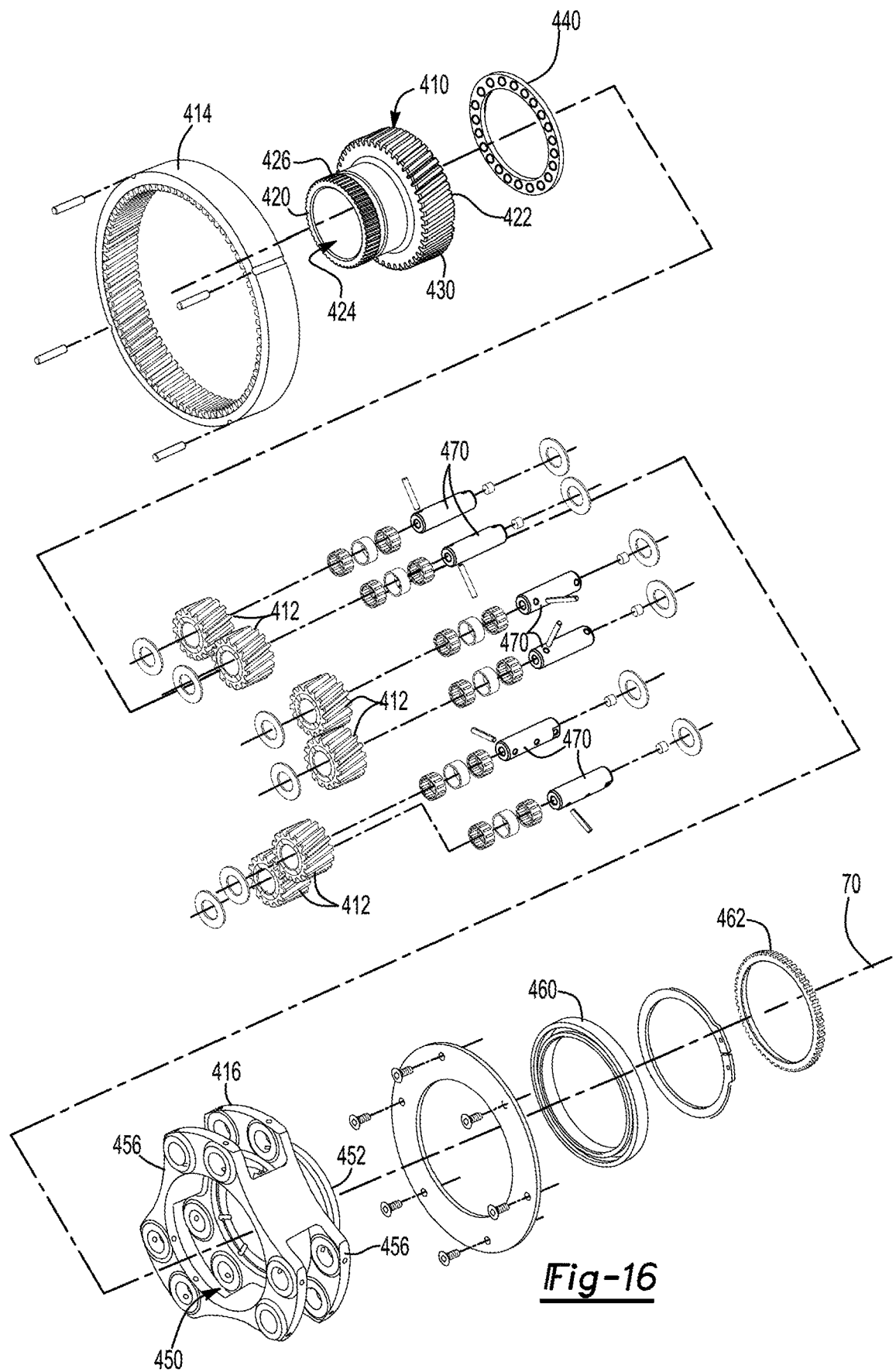

Referring to FIGS. 3, 9 and 16, the sun gear 410 may be disposed proximate the center of the planetary gear set 400 and may be rotatable about the first axis 70. The sun gear 410 may be operatively connectable to the electric motor module 28. In addition, the sun gear 410 may extend into the motor cover opening of the motor cover 210. As is best shown primarily with reference to FIGS. 9 and 16, the sun gear 410 may be a hollow tubular body that may include a first end surface 420, a second end surface 422, a sun gear hole 424, a sun gear spline 426, a first gear portion 428, and a second gear portion 430.

The first end surface 420 may be disposed at an end of the sun gear 410 that may face toward the axle housing 40.

The second end surface 422 may be disposed at an end of the sun gear 410 that may face away from the axle housing 40. As such, the second end surface 422 may be disposed opposite the first end surface 420. A thrust bearing 440 may extend from the second end surface 422 to the planet gear carrier 416 to help inhibit axial movement of the sun gear 410 and facilitate rotation of the sun gear 410 with respect to the planet gear carrier 416.

The sun gear hole 424 may extend from the first end surface 420 to the second end surface 422. The sun gear hole 424 may extend along and may be centered about the first axis 70. The drive pinion 26 may extend through the sun gear hole 424 and may be spaced apart from the sun gear 410.

The sun gear spline 426 may facilitate coupling of the sun gear 410 to a rotor output flange 230. In at least one configuration, the sun gear spline 426 may be disposed opposite the sun gear hole 424 and may extend from or may be disposed proximate the first end surface 420. As such, the sun gear spline 426 may be received inside the rotor output flange 230 and may mesh with the rotor output flange spline 310. It is also contemplated that the sun gear spline 426 may be disposed in the sun gear hole 424 and the rotor output flange 230 may be received inside the sun gear 410.

The first gear portion 428 may be disposed in the sun gear hole 424. For example, the first gear portion 428 may be disposed proximate the second end surface 422 of the sun gear 410. Teeth of the first gear portion 428 may be arranged around the first axis 70 and may extend toward the first axis 70 and may be configured to mesh with teeth of a shift collar 504 as will be discussed in more detail below.

The second gear portion 430 may be disposed opposite the first gear portion 428. The second gear portion 430 may be disposed proximate the second end surface 422 of the sun gear 410. The second gear portion 430 may have teeth that may mesh with teeth of the planet gears 412. The teeth of the second gear portion 430 may be arranged around the first axis 70 and may extend away from the first axis 70.

The planet gears 412 may be rotatably disposed between the sun gear 410 and the planetary ring gear 414. Each planet gear 412 may have a hole and a set of teeth. The hole may be a through hole that may extend through the planet gear 412. The set of teeth may be disposed opposite the hole. The set of teeth may mesh with teeth of the second gear portion 430 of the sun gear 410 and teeth on the planetary ring gear 414. Each planet gear 412 may be configured to rotate about a different planet gear axis of rotation. The planet gear axes of rotation may extend substantially parallel to the first axis 70.

Referring to FIGS. 3, 9 and 16, the planetary ring gear 414 may extend around the first axis 70 and may receive the planet gears 412. The planetary ring gear 414 may include a set of planetary ring gear teeth that may extend toward the first axis 70 and may mesh with teeth on the planet gears 412. The planetary ring gear 414 may be stationary with respect to the first axis 70. For example, the planetary ring gear 414 may be received in and may be fixedly disposed on the motor cover 210, the shift mechanism housing 500, or combinations thereof.

The planet gear carrier 416 may be rotatable about the first axis 70 and may rotatably support the planet gears 412. In at least one configuration, the planet gear carrier 416 may include a planet gear carrier hole 450, a planet gear carrier ring 452, a planet gear carrier gear portion 454, and at least one planet gear carrier flange 456.

The planet gear carrier hole 450 may be a through hole that may extend through planet gear carrier 416. The planet gear carrier hole 450 may extend along and may be centered about the first axis 70.

The planet gear carrier ring 452 may at least partially define the planet gear carrier hole 450. The planet gear carrier ring 452 may extend around the first axis 70 and may extend in an axial direction away from the second flange. The planet gear carrier ring 452 may be configured to support a support bearing 460 and a tone ring 462. The support bearing 460 may rotatably support the planet gear carrier 416 on a stationary component, such as the shift mechanism housing. The tone ring 462 may have a plurality of teeth and may receive and may be fixedly disposed on the planet gear carrier ring 452.

The planet gear carrier gear portion 454 may be disposed in the planet gear carrier ring 452 and may extend into the planet gear carrier hole 450. Teeth of the planet gear carrier gear portion 454 may be arranged around the first axis 70 and may extend toward the first axis 70.

One or more planet gear carrier flanges 456 may extend away from the first axis 70 and may help support the planet gears 412. For instance, a planet pin 470 may rotatably support each planet gear 412 and may extend from at least one planet gear carrier flange 456.

Shift Mechanism

Referring to FIG. 2, the shift mechanism 32 may be disposed at an end of the axle assembly 10 that may be disposed opposite the axle housing 40. The shift mechanism 32 may be disposed on the motor cover 210.

The gear reduction module 30 may cooperate with the shift mechanism 32 to provide a desired gear reduction ratio to change the torque provided from the electric motor module 28 to the differential assembly 22, and hence to the axle shafts 24 of the axle assembly 10. For example, the gear reduction module 30 may provide a first drive gear ratio and a second drive gear ratio. The first drive gear ratio, which may be referred to as a low range gear ratio, may provide gear reduction from the electric motor module 28 to the differential assembly 22 and hence to the axle shafts 24. As a nonlimiting example, the first drive gear ratio may provide a 2:1 gear ratio or more. The first drive gear ratio may provide increased torque to a vehicle traction wheel as compared to the second drive gear ratio.

The second drive gear ratio, which may be referred to as a high range gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy.

In addition, a neutral position or neutral drive gear ratio may be provided in which torque may not be provided to the differential assembly 22 by the electric motor module 28 or may not be transmitted between the electric motor module 28 and the differential assembly 22. For instance, torque may not be transmitted between the gear reduction module 30 and the drive pinion 26 when a shift collar is in the neutral position.

Figure 10:
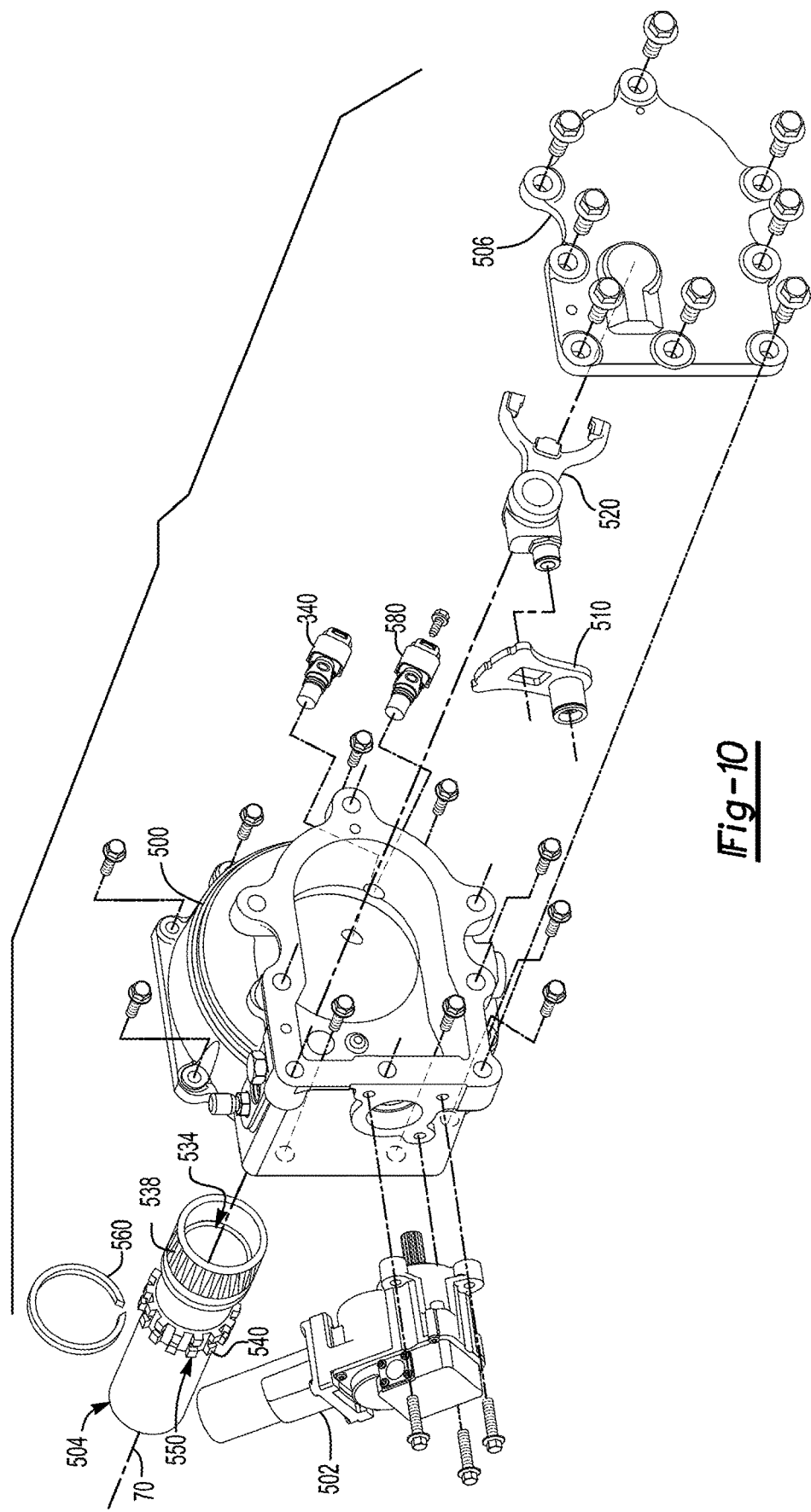

Referring to FIGS. 2, 10 and 18, the shift mechanism 32 may include a shift mechanism housing 500, an actuator 502, and a shift collar 504.

The shift mechanism housing 500 may be disposed on the motor cover 210 or may be fixedly positioned with respect to the motor cover 210. For example, the shift mechanism housing 500 may be mounted to a side of the motor cover 210 that may be disposed opposite the differential carrier 42. The shift mechanism housing 500 may at least partially receive the gear reduction module 30. In addition, the shift mechanism housing 500 may facilitate mounting of the actuator 502 and may at least partially receive the shift collar 504. The shift mechanism housing 500 may include an end plate 506 that may be disposed opposite the axle housing 40 and that may be removably mounted to the shift mechanism housing 500.

Figure 17:
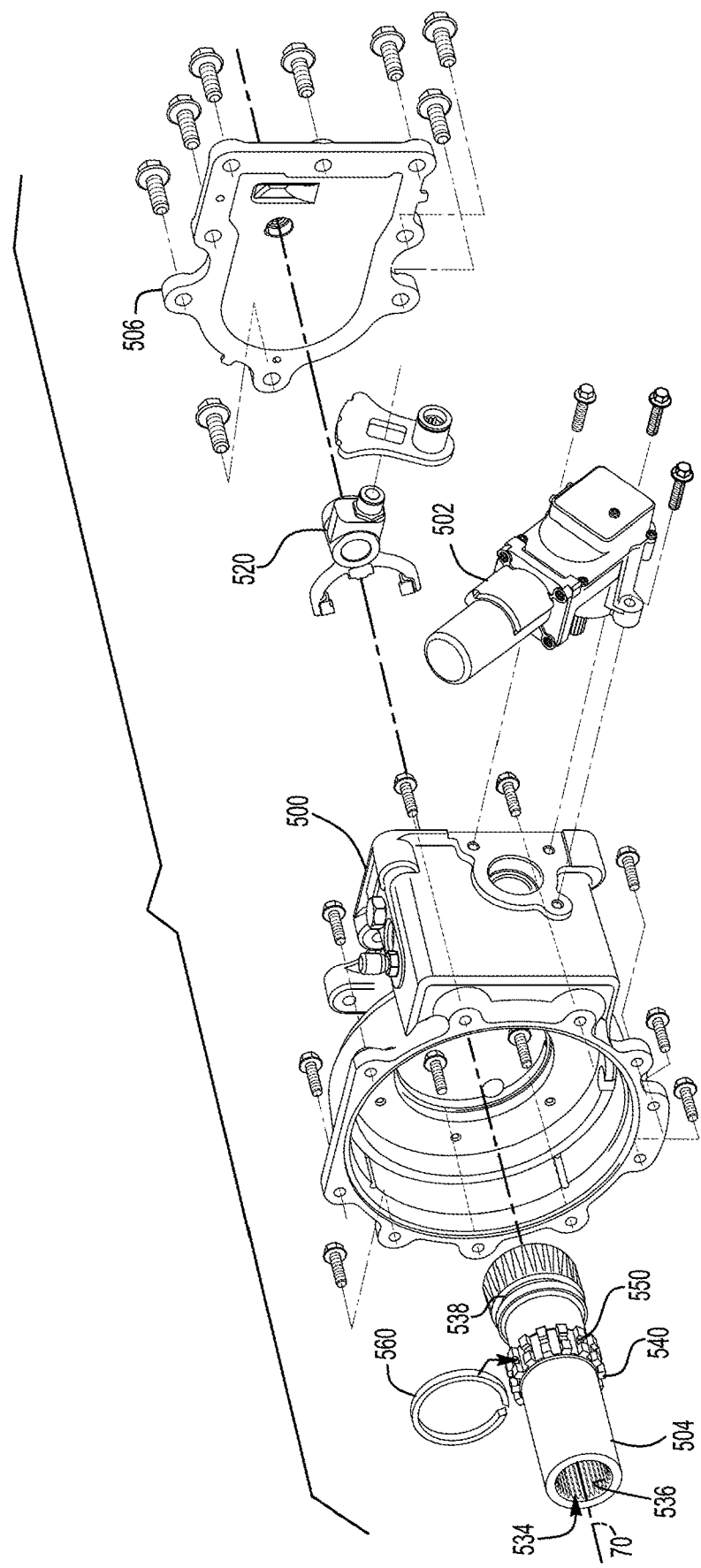

Referring to FIGS. 10 and 17 an example of an actuator 502 that may actuate the shift collar 504 shown. The actuator 502 may be of any suitable type and may have any suitable configuration. For instance, the actuator 502 may be an electrical, electromechanical, pneumatic or hydraulic actuator. In at least one configuration, the actuator 502 may have an output shaft that may be rotatable about an axis. A cam 510 may be mounted to the output shaft and may rotate with the output shaft. The cam 510 may operatively connect the actuator 502 to the linkage 520. As such, rotation of the output shaft may actuate the cam 510, which in turn may actuate the linkage 520 and the shift collar 504 along the first axis 70. The actuator 502 may be mounted on the shift mechanism housing 500.

Figure 19:
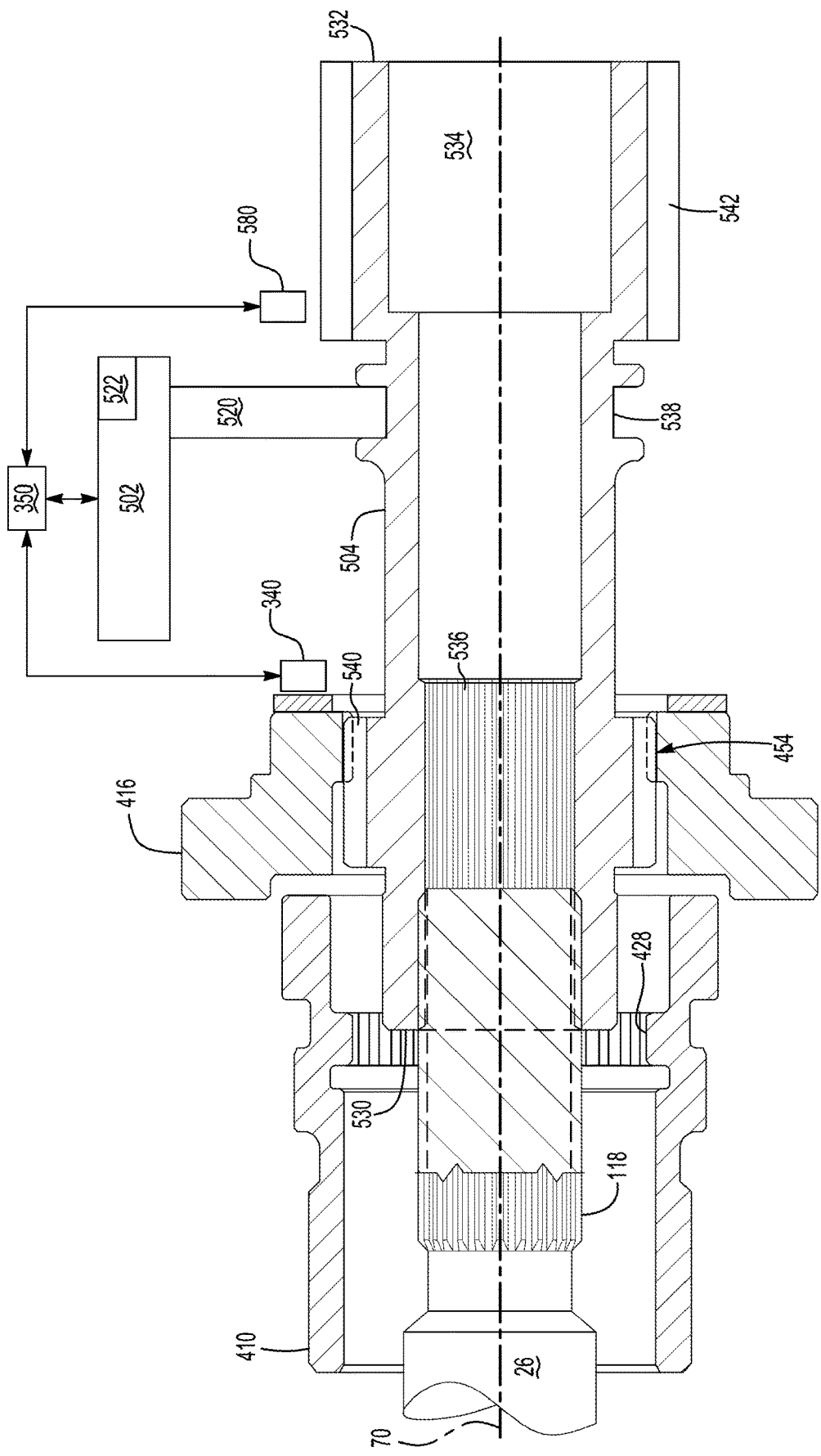
FIG. 19 is a section view showing the shift collar in a first position.
Figure 20:
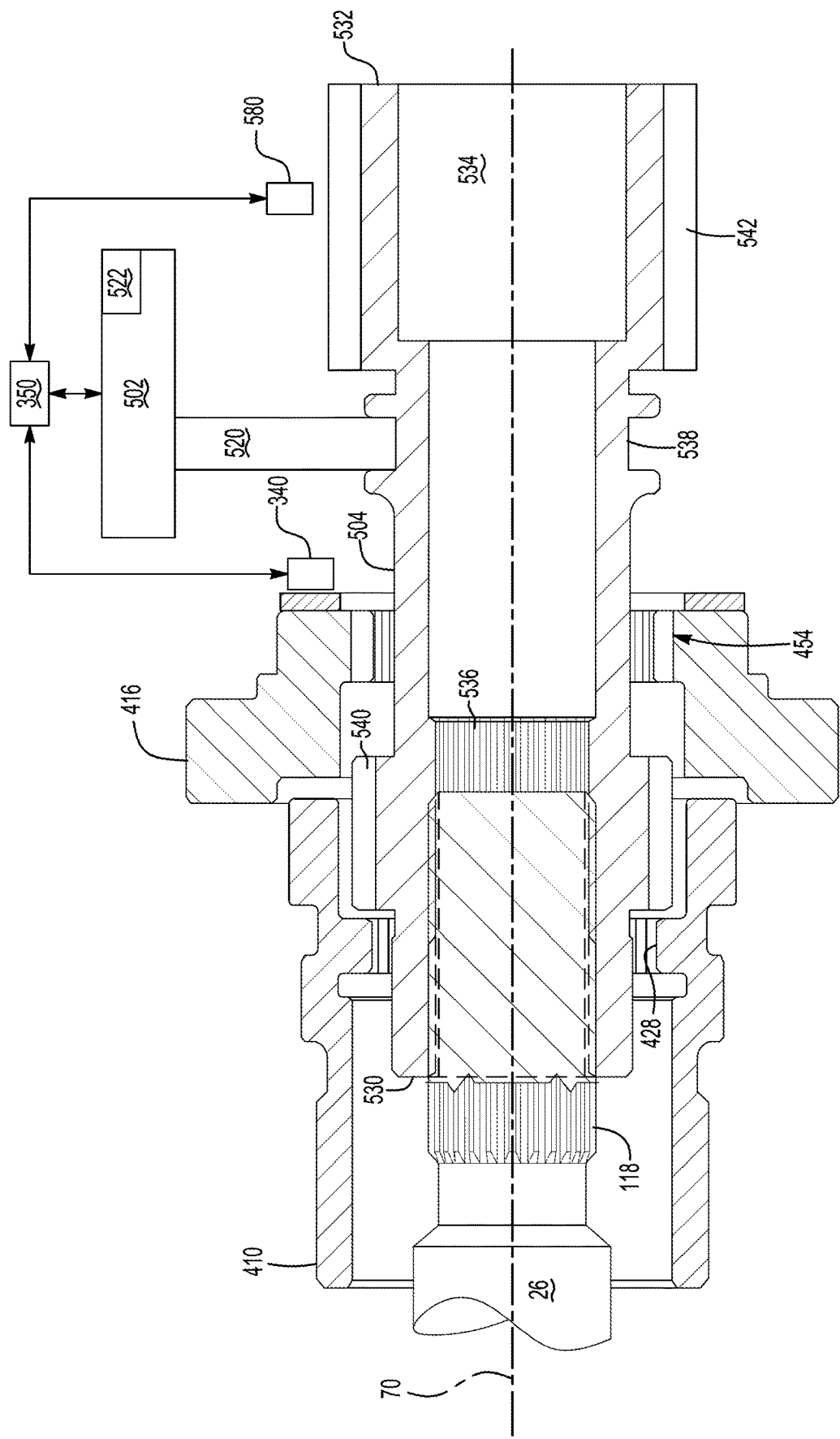
FIG. 20 is a section view showing the shift collar in a second position.
Figure 21:
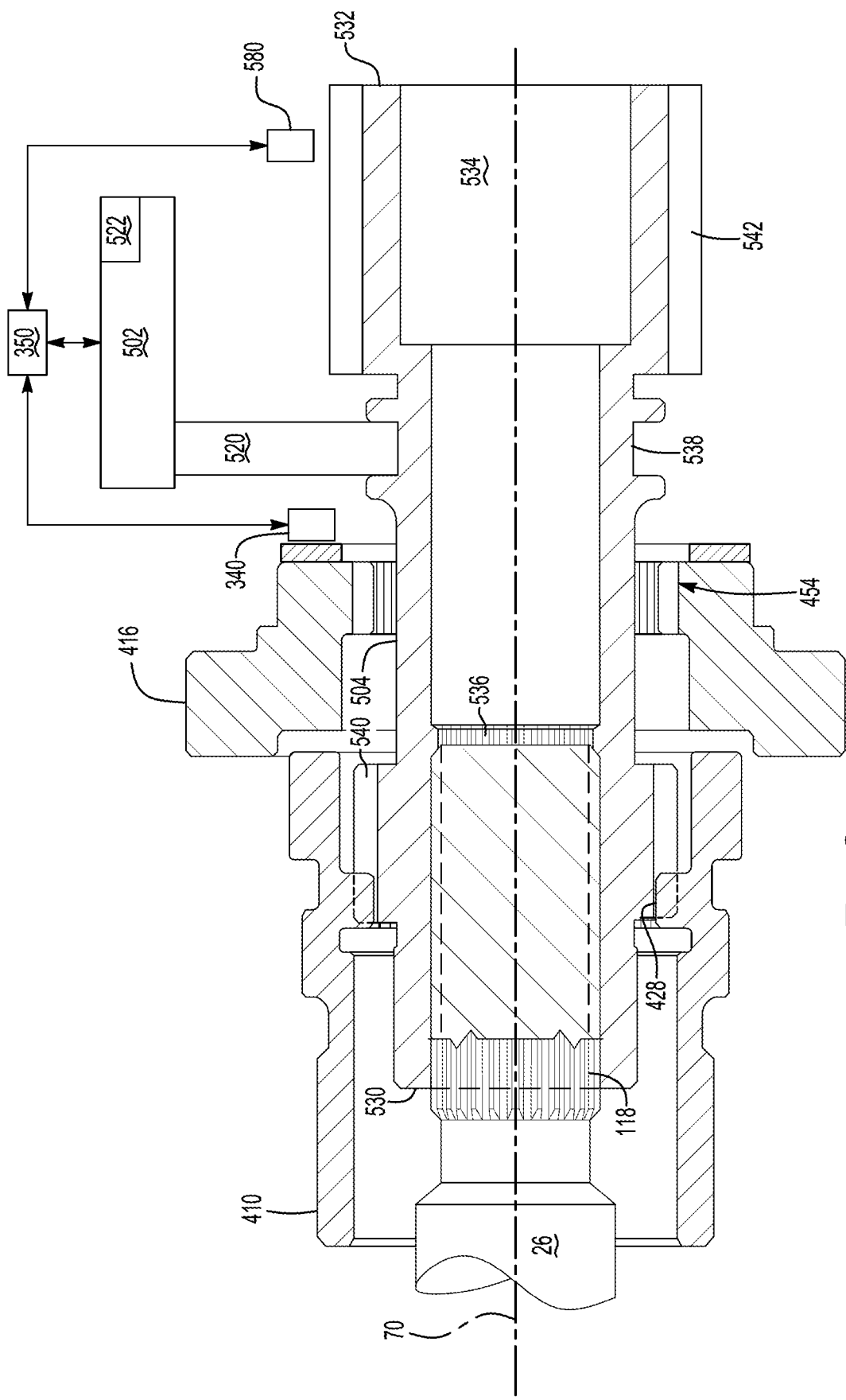
FIG. 21 is a section view showing the shift collar in a third position.

The actuator 502 may move the shift collar 504 along the first axis 70 between a plurality of positions to selectively couple the shift collar 504 to the gear reduction module 30 or to decouple the shift collar 504 from the gear reduction module 30. For instance, the actuator 502 may move the shift collar 504 along the first axis 70 between the first, second, and third positions. Examples of these positions are illustrated in FIGS. 19, 20, and 21. As is best shown in FIGS. 19-21, the actuator 502 may include an actuator sensor 522 that may provide a signal that may be indicative of the position of the actuator 502 and hence the position of the shift collar 504.

Referring to FIGS. 2 and 19, the shift collar 504 is shown in the first position. In the first position, the shift collar 504 may couple the planet gear carrier 416 to the drive pinion 26. For example, the teeth of the shift collar gear 540 may mesh with the teeth of the planet gear carrier gear portion 454 of the planet gear carrier 416. As such, torque that is provided by the electric motor module 28 may be transmitted through the rotor output flange 230, sun gear 410, planet gears 412, and planet gear carrier 416 to the shift collar 504 and from the shift collar 504 to the drive pinion 26. The torque may be provided at the first gear ratio in the first position.

Referring to FIG. 20, the shift collar 504 is shown in a second position or neutral position. The second position may be axially positioned between the first position and the third position. In the second position, the shift collar 504 may not couple the gear reduction module 30 to the drive pinion 26. For example, the teeth of the shift collar gear 540 may not mesh with the teeth of the sun gear 410 or the planet gear carrier 416. As such, torque that is provided by the electric motor module 28 may not be transmitted to the shift collar 504 or the drive pinion 26. The shift collar 504 may be disposed closer to the axle housing 40 when in the second position than when in the first position.

Referring to FIG. 21, the shift collar 504 is shown in the third position. In the third position, the shift collar 504 may couple the sun gear 410 to the drive pinion 26. For example, the teeth of the shift collar gear 540 may mesh with the teeth of the first gear portion 428 of the sun gear 410. As such, torque that is provided by the electric motor module 28 may be transmitted through the rotor output flange 230 and sun gear 410 to the shift collar 504 and from shift collar 504 to the drive pinion 26. Torque may be provided at a second gear ratio in the third position. The shift collar 504 may be disposed closer to the axle housing 40 when in the third position than when in the second position.

Referring primarily to FIGS. 2 and 18, the shift collar 504 may be at least partially received in the shift mechanism housing 500. For instance, the shift collar 504 may be at least partially received in the shift mechanism housing 500 and may extend through components of the gear reduction module 30, such as the planet gear carrier 416. In addition, the shift collar 504 may be rotatable with the drive pinion 26 and may be movable along the first axis 70 with respect to the drive pinion 26. In at least one configuration such as is best shown with reference to FIGS. 17 and 18, the shift collar 504 may include a first end 530, a second end 532, a shift collar hole 534, a shift collar spline 536, a shift collar groove 538, a shift collar gear 540, and a set of detection features 542.

The first end 530 may face toward the differential carrier 42. In addition, the first end 530 may be disposed adjacent to the drive pinion 26.

The second end 532 may be disposed opposite the first end 530. As such, the second end 532 may face away from the differential carrier 42.

The shift collar hole 534 may be a through hole that may extend through the shift collar 504. For instance, the shift collar hole 534 may extend from the first end 530 to the second end 532. The shift collar hole 534 may extend around and along the first axis 70. The shift collar hole 534 may receive the shaft portion 102 of the drive pinion 26.

Referring to FIGS. 17 and 19, the shift collar spline 536 may be disposed in the shift collar hole 534. The shift collar spline 536 may be axially positioned near the first end 530. The shift collar spline 536 may extend toward the first axis 70 and may mate with the spline 118 of the drive pinion 26. The mating splines may allow the shift collar 504 to move in an axial direction or along the first axis 70 while inhibiting rotation of the shift collar 504 about the first axis 70 with respect to the drive pinion 26. Thus, the shift collar 504 may be rotatable about the first axis 70 with the drive pinion 26 when the shift collar spline 536 mates with the spline 118.

The shift collar groove 538 may be disposed proximate a second end of the shift collar 504 that may face toward the end plate 506 or may be disposed proximate the set of detection features 542. The shift collar groove 538 may face away from the first axis 70 and may extend around the first axis 70. The shift collar groove 538 may receive a linkage 520, such as the shift fork, that may operatively connect the shift collar 504 to the actuator 502.

The shift collar gear 540 may be disposed between the first end and the second end of the shift collar 504. The shift collar gear 540 may be disposed opposite the shift collar hole 534. The shift collar gear 540 may have teeth that may be arranged around the first axis 70 and that may extend away from the first axis 70. An annular groove 550 may optionally be provided in the shift collar gear 540. The annular groove 550 may extend partially or completely around the first axis 70. As is best shown in FIGS. 10 and 17, the annular groove 550 may receive a stop 560 that may limit axial movement of the shift collar 504. The stop 560 may have any suitable configuration. For instance, the stop 560 may be configured as a protrusion. As an example, the stop 560 may include one or more snap rings.

Referring to FIG. 18, the set of detection features 542 may be arranged around the first axis 70. Each detection feature 542 may protrude away from the first axis 70 such that a recess or gap 570 may be provided between adjacent detection features 542. In at least one configuration, the detection features 542 may have common configurations and may be arranged in a repeating pattern. The detection features 542 may be located in any suitable location where they may be detected with a sensor 580. For instance, the detection features 542 may be located outside of components of the gear reduction module 30, such as outside of the sun gear 410, the planet gear carrier 416, or both. As an example, the set of detection features 542 may be disposed adjacent to the second end 532 of the shift collar 504. In at least one configuration, the set of detection features 542 may be disposed between the second end 532 and the shift collar groove 538. For example, the detection features 542 may extend between the second end 532 and the shift collar groove 538, may extend from the second end 532 to or toward the shift collar groove 538, or may extend from the shift collar groove 538 to or toward the second end 532.

As an overview, the detection features 542 may be configured to allow the sensor 580 detect the presence or absence of a detection feature 542 and generate a signal in response. For instance, the signal generated by the sensor 580 may vary as the shift collar 504 rotates about the first axis 70. The sensor 580 may provide a signal that is "off" (e.g., zero voltage) when a detection feature 542 is not detected and may provide a signal that is "on" (e.g., a positive voltage such as 5V) when a detection feature 542 is detected. As such, the signal may manifest as a sequence of pulses between "off" and "on" when the shift collar 504 rotates about the first axis 70. The signal and its pulses may be processed, such as with the controller 350, to provide a duty cycle. The duty cycle may be a ratio of time that the signal is "on" compared to the time that the signal is "off" (e.g., the duty cycle may be a ratio between the duration of a pulse or pulse width and the period). Duty cycle may be expressed as a percentage and may describe the percentage of time that a signal is "on" over an interval or period of time. As will be discussed in more detail below, different duty cycles may be associated with two or more positions in which the shift collar 504 may be positioned along the first axis 70. The different duty cycles may be provided by configuring the detection features 542 such that the width of a detection feature 542 changes in an axial direction or in a direction that extends along the first axis 70. By using a duty cycle, the axial position of the shift collar 504 may be ascertained over a range of rotational speeds of the shift collar 504 or independent of the rotational speed of the shift collar 504. Accordingly, the sensor 580 may detect rotation or the rotational speed of the shift collar 504 based on the rate at which the detection features 542 rotate about the first axis 70, may detect the axial position of the shift collar 504 along the first axis 70 based on the duty cycle, or both.

By detecting the axial position of the shift collar 504, the sensor 580 may provide redundant functionality with respect to the actuator sensor 522. In other words, the actuator sensor 522 and the sensor 580 may both be capable of detecting the axial position of the shift collar 504, and hence whether the gear reduction module 30 is in a neutral position or whether a gear ratio is engaged. Accordingly, the sensor 580 may provide backup functionality in addition to the actuator sensor 522, verification functionality in that signals from the actuator sensor 522 and the sensor 580 may be compared by the controller 350 to verify a shift position, or diagnostic capabilities that may assess whether a sensor is operating properly. Moreover, the sensor 580 may directly detect the position of the shift collar 504 as opposed to the actuator sensor 522 that may detect the angular position of the output shaft of the actuator 502. As such, the actuator sensor 522 may indirectly detect the position of the shift collar 504 and may not be capable of detecting improper operation of intervening components, such as the cam 510 or linkage 520. The sensor 580 may also detect rotational speed in axial position of the shift collar 504 as will be discussed in more detail below, which may eliminate the need to provide separate sensors to detect rotational speed and axial position, which may help reduce weight, package space or length of the axle assembly, and associated costs.

Various configurations of detection features and associated duty cycles will now be described. Examples of detection features 542 are illustrated in the FIGS. 22 through 27 that end with the letter A (i.e., FIGS. 22A, 23A, 24A, 25A, 26A, and 27A). Associated pulses that may be detected by the sensor 580 are illustrated in the corresponding figures that end with the letter B (i.e., FIGS. 22B, 23B, 24B, 25B, 26B, and 27B).

In the "A" figures, an approximation of a top view of a pair of detection features 542 is shown (noting that additional detection features may be provided and arranged around the first axis 70). In the "A" figures, the horizontal dotted line designated P1 may represent the axial location along the detection features 542 that may be detected by the sensor 580 when the shift collar 504 is in a first position along the first axis 70. The horizontal short dash line designated P2 may represent the axial location along the detection features 542 that may be detected by the sensor 580 when the shift collar 504 is in a second position along the first axis 70. The horizontal long dash line designated P3 may represent the axial location along the detection features 542 that may be detected by the sensor 580 when the shift collar 504 is in a third position along the first axis 70.

In the "B" figures, the pulses associated with the first, second, and third positions are shown. Each plot is aligned below its corresponding "A" figure. The vertical axis may designate the "off" position with a zero and the "on" position with a 1. The horizontal axis may represent time. The dotted, short dash, and long dash lines in the "B" figures correspond with the line types used in the "A" figures. It is noted that the lines overlap in the "on" position and thus generally appear as a solid line.

In FIGS. 22A, 23A, 24A, and 25A, each detection feature 532 may have a first flank 590 and a second flank 592 that is disposed opposite the first flank 590. In these figures, the first flank 590 may become progressively closer to the second flank 592 in a direction that extends from the bottom of the figure toward the top of the figure. This direction may be referred to as a first direction and may represent a direction along the first axis 70. For instance, the first direction may extend along the first axis 70 in a direction that extends from the second end 532 of the shift collar 504 toward the first end 530 of the shift collar 504. It is also contemplated that the first direction or orientation of the detection features 542 may be reversed, in which case the first direction may extend along the first axis 70 from the first end 530 toward the second end 532. The first flank 590 and the second flank 592 may be substantially planar in one or more configurations, such as the configurations shown in FIGS. 22A, 23A, and 24A.

Referring to FIG. 22A, detection features 542 are shown with a first flank 590 and a second flank 592 that are tapered and become progressively closer together in the first direction. For instance, the first flank 590 and the second flank 592 may become progressively closer as the distance from the second end 532 increases. The first flank 590 may be disposed in a first plane that may be disposed in a nonparallel relationship with the first axis 70. The second flank 592 may be disposed in a second plane that may be disposed in a nonparallel relationship with the first axis 70. The first flank 590 and the second flank 592 may be disposed in a nonparallel relationship such that the first plane may intersect the second plane is represented by the intersecting plane lines extending above the flanks from the perspective shown. As such, the width or distance from the first flank 590 to the second flank 592 along line P1 may be greater than the width or distance from the first flank 590 to the second flank 592 along line P2. Similarly, the width or distance from the first flank 590 to the second flank 592 along line P2 may be greater than the width or distance from the first flank 590 to the second flank 592 along line P3.

Referring to FIG. 22B, a corresponding signal plot is shown. The signal may include pulses that may be proportional to the width of the detection feature 542. The pulse width associated with the first position (P1) is greater than the pulse width associated with the second position (P2). The pulse width associated with the second position (P2) is greater than the pulse width associated with the third position (P3). The signal and its pulses may be processed to provide a duty cycle as previously discussed. Accordingly, the duty cycle associated with the first position may differ from the duty cycle associated with the second position and the duty cycle associated with the third position may differ from the duty cycle associated with the first and second positions. In the configuration illustrated, the duty cycle associated with the first position may be greater than the duty cycle associated with the first and second positions and the duty cycle associated with the second position may be greater than the duty cycle associated with the third position. As a nonlimiting example, the duty cycle in the first position may be approximately 75%, the duty cycle and the second position may be approximately 50%, and the duty cycle in the third position may be approximately 25%. The duty cycle may be compared to a predetermined value or predetermined duty cycle range that may be stored in memory and may be accessed by the controller 350. For instance, duty cycle ranges corresponding with the first, second, and third positions may be stored in memory, such as in a lookup table, and the controller 350 may determine what position the shift collar 504 is located in by comparing the current duty cycle with the duty cycle ranges to determine which duty cycle range corresponds with the current duty cycle.

Referring to FIG. 23A, detection features 542 are shown with a first flank 590 and a second flank 592 that are tapered and become progressively closer together in the first direction. The first flank 590 may be disposed in a first plane that may be disposed in a non-parallel relationship with the first axis 70. The second flank 592 may be disposed in a second plane that may be disposed in a parallel relationship with the first axis 70 or a substantially parallel relationship (within ±1°) with the first axis 70. The width or distance from the first flank 590 to the second flank 592 along line P1 may be greater than the width or distance from the first flank 590 to the second flank 592 along line P2. Similarly, the width or distance from the first flank 590 to the second flank 592 along line P2 may be greater than the width or distance from the first flank 590 to the second flank 592 along line P3.

Referring to FIG. 23B, a corresponding signal plot is shown. The pulse width associated with the first position (P1) is greater than the pulse width associated with the second position (P2). The pulse width associated with the second position (P2) is greater than the pulse width associated with the third position (P3). The signal and its pulses may be processed to provide a duty cycle as previously described. The duty cycle associated with the first position may be greater than the duty cycle associated with the second position and the duty cycle associated with the second position may be greater than the duty cycle associated with the third position. The controller 350 may determine what position the shift collar 504 is located in by comparing the current duty cycle with the duty cycle ranges to determine which range corresponds with the current duty cycle as previously discussed.

Referring to FIG. 24A, the first flank 590 and the second flank 592 are configured in a relationship opposite that shown in FIG. 23A. The detection features 542 are shown with a first flank 590 and a second flank 592 that are tapered and become progressively closer together in the first direction, however, the first flank 590 may be disposed in a parallel or substantially parallel relationship with the first axis 70 while the second flank 592 may be disposed in a non-parallel relationship with the first axis 70. The width or distance from the first flank 590 to the second flank 592 along line P1 may be greater than the width or distance from the first flank 590 to the second flank 592 along line P2. Similarly, the width or distance from the first flank 590 to the second flank 592 along line P2 may be greater than the width or distance from the first flank 590 to the second flank 592 along line P3.

Referring to FIG. 24B, a corresponding signal plot is shown. The pulse widths maybe the same as those in FIG. 23B but may be offset along the horizontal axis as compared to FIG. 23B.

Referring to FIG. 25A, detection features 542 are shown in which the first flank 590 and the second flank 592 may become progressively closer together but may be nonlinear or nonplanar. For instance, the first flank 590 and the second flank 592 may each extend along an arc or a curve between its opposing ends. In the configuration shown, the first flank 590 and the second flank 592 are illustrated as being concave; however, it is contemplated that the first flank 590, the second flank 592, or both may be convex. The width or distance from the first flank 590 to the second flank 592 along line P1 may be greater than the width or distance from the first flank 590 to the second flank 592 along line P2. Similarly, the width or distance from the first flank 590 to the second flank 592 along line P2 may be greater than the width or distance from the first flank 590 to the second flank 592 along line P3.

Referring to FIG. 25B, a corresponding signal plot is shown. The pulse width associated with the first position (P1) is greater than the pulse width associated with the second position (P2). The pulse width associated with the second position (P2) is greater than the pulse width associated with the third position (P3). The duty cycle associated with the first position may be greater than the duty cycle associated with the second position and the duty cycle associated with the second position may be greater than the duty cycle associated with the third position. The controller 350 may determine what position the shift collar 504 is located in by comparing the current duty cycle with the duty cycle ranges to determine which range corresponds with the current duty cycle as previously discussed.

Referring to FIG. 26A, detection features 542 are shown with a configuration in at least which one flank may have a stepped profile. The profile may be stepped relative to a center plane 600 of the detection feature 542. The center plane 600 may be disposed parallel to the first axis 70. For instance, the first axis 70 may be completely disposed in the center plane 600 and one or more configurations. The center plane 600 may bisect the detection feature 542 in configurations where the detection feature 542 is symmetrical or in which the first flank 590 and the second flank 592 have mirror symmetry with respect to the center plane 600. The center plane 600 may not bisect the detection feature 542 in configurations that do not have mirror symmetry. However, the center plane 600 may still be disposed between the first flank 590 and the second flank 592. The center plane 600 may be spaced apart from the first flank 590 and the second flank 592.

Referring to FIG. 26A, the first flank 590, the second flank 592, or both, may have a plurality of flank segments, such as a first flank segment 610, a second flank segment 612, and a third flank segment 614. The first flank segment 610, the second flank segment 612, and the third flank segment 614 may be disposed in a parallel or nonparallel relationship. In the configuration shown, a parallel relationship is depicted in which the second flank segment 612 is disposed closer to the center plane 600 than the first flank segment 610 and the third flank segment 614 is disclosed closer to the center plane 600 and the second flank segment 612. As such, the sensor 580 may detect the first flank segment 610 along line P1, the second flank segment 612 along line P2, and the third flank segment 614 along line P3. The width or distance from the first flank 590 to the second flank 592 (or between opposing first flank segments 610 in the configuration shown) along line P1 may be greater than the width or distance from the first flank 590 to the second flank 592 (or between opposing second flank segments 612) along line P2. Similarly, the width or distance from the first flank 590 to the second flank 592 along line P2 may be greater than the width or distance from the first flank 590 to the second flank 592 (or between opposing third flank segments 614) along line P3.

Referring to FIG. 26B, a corresponding signal plot is shown. The pulse width associated with the first position (P1) is greater than the pulse width associated with the second position (P2). The pulse width associated with the second position (P2) is greater than the pulse width associated with the third position (P3). The duty cycle associated with the first position may be greater than the duty cycle associated with the second position and the duty cycle associated with the second position may be greater than the duty cycle associated with the third position. The controller 350 may determine what position the shift collar 504 is located in by comparing the current duty cycle with the duty cycle ranges to determine which range corresponds with the current duty cycle as previously discussed.

Referring to FIG. 27A, another stepped flank configuration is shown. In this configuration, the first flank segment 610 and the third flank segment 614 may have the same configuration or may be disposed at the same distance from the center plane 600 while the second flank segment 612 is disposed at a different distance from the center plane 600. It is contemplated that the second flank segment 612 may be disposed further from the center plane 600 than the first flank segment 610 and the third flank segment 614 as shown or that the second flank segment 612 may be disposed closer to the center plane 600 than the first flank segment 610 and the third flank segment 614.

Referring to FIG. 27B, a corresponding signal plot is shown. The pulse width associated with the first position (P1) and the third position (P3) may differ from the pulse width associated with the second position (P2). As such, the duty cycle associated with the second position (P2) may differ from the duty cycle associated with the first position (P1) and the third position (P3). Moreover, the pulse width and/or duty cycle associated with the first position (P1) may be the same as the pulse width and/or duty cycle associated with the third position (P3). As such, the signal from the sensor 580 may be used to distinguish the second position (P2) from the first position (P1) and the third position (P2) but may not be used to distinguish the first position (P1) from the third position ((P3). The controller 350 may determine what position the shift collar 504 is located in by comparing the current duty cycle with the duty cycle ranges to determine which range corresponds with the current duty cycle as previously discussed. For instance, the duty cycle ranges associated with the first and third positions may be the same while the duty cycle arranged associated with the second position may differ from the duty cycle ranges associated with the first and third positions.

Referring to FIG. 28A, a configuration is shown in which the shift collar 502 has detection features 542 that are provided with a plurality of toothed rings. One or more toothed rings may be provided. In the configuration shown, the shift collar 502 has a first toothed ring 620, a second toothed ring 622, and a third toothed ring 624. The first toothed ring 620, the second toothed ring 622, and the third toothed ring 624 may be positioned along the first axis 70. The first toothed ring 620, the second toothed ring 622, and the third toothed ring 624 may be axially spaced apart from each other or may be separated with spacers 626 that may be disposed closer to the first axis 70 than the teeth of the toothed rings and optionally closer to the first axis 70 than the bottom of the gaps 570 between the teeth of the toothed rings. The detection features 542 and toothed rings may be located in any suitable location where they may be detected with the sensor 580, such as adjacent to the second end 532 of the shift collar 504 or between the second end 532 and the shift collar groove 538 as previously discussed.

Referring to FIG. 28B, a side view of examples of the toothed rings are shown. The toothed rings may be centered about the first axis 70. Each toothed ring may have detection features 542 that may be configured as teeth that may that protrude away from the first axis 70. Individual teeth that are provided with the first toothed ring 620, the second toothed ring 622, and the third toothed ring 624 may have the same configurations. For instance, the teeth may have the same size, shape, and may protrude by the same distance from the first axis 70. Moreover, the teeth may be arranged such that adjacent teeth may be equidistantly spaced from each other. However, each toothed ring may have a different number of teeth. In the example shown, the first toothed ring 620 is missing one tooth, the second toothed ring 622 is missing two teeth, and the third toothed ring 624 is missing three teeth. Any suitable configuration may be provided in which each toothed ring has a different number of teeth. For instance, one toothed ring may be provided without any missing teeth or all toothed rings may be provided with multiple missing teeth. Missing teeth locations may be located adjacent to each other or may be spaced apart from each other. The teeth of each toothed ring may or may not be axially aligned with each other. The sensor 580 may detect the first toothed ring 620 when the shift collar 504 is in the first position, may detect the second toothed ring 622 when the shift collar 504 is in the second position, and may detect the third toothed ring 624 when the shift collar 504 is in the third position.

Referring to FIG. 28C, a corresponding signal plot is shown. In this signal plot, the darkened squares may represent detection of a tooth or a pulse that may be associated with detection of a tooth while the non-darkened squares may represent gaps between teeth. Accordingly, a signal may include pulses that may be a function of the number of teeth of a detected toothed ring. Thus, different axial positions of the shift collar 504 may be based on the change in frequency at which teeth are detected. The number of teeth that may be detected by the sensor 580 over one revolution of the shift collar 504 at the first position (P1) may differ from the number of teeth detected over one revolution at the second position (P2). The number of teeth that may be detected over one revolution at the third position (P3) may differ from the number of teeth detected over one revolution at the first position (P1), the second position (P2), or both.

The detected tooth count or frequency may be compared to predetermined tooth counts or frequencies that may be stored in memory and may be accessed by the controller 350. For instance, tooth counts or frequencies corresponding with the first, second, and third positions may be stored in memory, such as in a lookup table, and the controller 350 may determine what position the shift collar 504 is located in by comparing the current tooth count or frequency with the tooth counts or frequencies in memory to determine which position with the current signal. In the example shown, a signal with a pulse pattern that has 18 pulses per revolution may correspond to the first position (P1), a pulse pattern that has 17 pulses per revolution may correspond to the second position (P2), and a pulse pattern that has 16 pulses per revolution may correspond to the third position (P3). The rate at which teeth may be detected may be indicative of the rotational speed of the shift collar 504. As such, the sensor 580 may detect the teeth of a toothed ring that is aligned with the sensor 580 and may provide a signal that may be indicative of rotation of the shift collar 504, positioning of the shift collar 504 along the first axis 70, or both. For instance, the sensor 580 may detect rotation or the rotational speed of the shift collar 504 based on the rate at which the teeth rotate about the first axis 70, may detect the axial position of the shift collar 504 along the first axis 70 based on the pulse pattern or number of pulses detected per revolution, or both.

Control

The controller 350 may control operation of the axle assembly 10. The controller 350 may receive signals from various sensors, such as the first sensor 340 and the sensor 580. In addition, the controller 350 may control the actuator 502 and thereby control movement of the shift collar 504.

The first sensor 340 may provide a first signal that may be indicative of a rotational speed of the gear reduction module 30 or a component thereof like the planet gear carrier 416. The sensor 580 may provide a second signal that may be indicative of a rotational speed of the drive pinion 26.

The controller 350 may use the first signal and the second signal to determine when a shift of the shift collar 504 may be executed. For instance, the controller 350 may use the first signal and the second signal to determine when the rotational speed of the shift collar 504 is sufficiently close to the rotational speed of a component of the planetary gear set 400, such as the sun gear 410 and/or the planet gear carrier 416 to permit the shift collar 504 to be shifted to or from the neutral position. The controller 350 operate the actuator 502 to move the shift collar 504 to a desired position when shifting of the shift collar 504 may be executed and completed.

As an example that starts with the shift collar 504 and the first position or the third position, the controller 350 may determine when the first and second signals are indicative of sufficiently close rotational speeds. The controller 350 may then temporarily relieve or reduced torque on the shift collar 504 by controlling the rotational speed of the rotor 206 or reducing power provided from an electrical power source/inverter to permit the shift collar 504 to be more easily be actuated from the first position or the third position to the second (neutral) position. The controller 350 may then operate the actuator 502 to move the shift collar 504 to the second position.

The controller 350 may move the shift collar 504 from the second position to either the first position or the third position by controlling the rotational speed of the rotor 206 to synchronize the rotational speed of the shift collar 504 with the sun gear 410 to allow the shift collar 504 to move to the second position to the first position or may synchronize the rotational speed of the shift collar 504 with the planet gear carrier 416 to allow the shift collar 504 to move from the neutral position to the third position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an electric motor module;
   a gear reduction module that is operatively connected to the electric motor module;
   a drive pinion that is rotatable about a first axis;
   a shift collar that is rotatable with the drive pinion and moveable along the first axis such that the shift collar is selectively couplable to the gear reduction module, the shift collar having a set of detection features that are arranged around the first axis such that a gap is provided between adjacent detection features; and
   a sensor that is configured to detect the set of detection features and provide a signal indicative of rotation of the shift collar about the first axis, wherein a duty cycle of the signal varies as the shift collar moves along the first axis and is indicative of positioning of the shift collar along the first axis.

2. The axle assembly of claim 1 wherein the shift collar has a first end that is disposed adjacent to the drive pinion and a second end that is disposed opposite the first end, wherein the set of detection features is disposed adjacent to the second end.

3. The axle assembly of claim 2 wherein the shift collar has a shift collar groove that receives a linkage that couples the shift collar to an actuator, wherein the set of detection features extend between the shift collar groove and the second end.

4. The axle assembly of claim 1 wherein the gear reduction module includes a planetary gear set that has a sun gear that is operatively connected to the electric motor module, a planetary ring gear, a planet gear that meshes with the sun gear and the planetary ring gear, and a planet gear carrier that rotatably supports the planet gear; and
   the shift collar is movable between a first position in which the shift collar couples the drive pinion to the planet gear carrier, a second position in which the shift collar is decoupled from the sun gear and the planet gear carrier, and a third position in which the shift collar couples the drive pinion to the sun gear, wherein a first duty cycle is associated with the first position, a second duty cycle is associated with the second position, and a third duty cycle is associated with the third position, and the second duty cycle differs from the first duty cycle and the third duty cycle.

5. The axle assembly of claim 4 wherein the first duty cycle is the same as the third duty cycle.

6. The axle assembly of claim 4 wherein the first duty cycle differs from the third duty cycle.

7. The axle assembly of claim 1 wherein each detection feature protrudes away from the first axis and has first flank and a second flank disposed opposite the first flank, wherein the first flank becomes progressively closer to the second flank in a first direction that extends along the first axis.

8. The axle assembly of claim 7 wherein the shift collar has a first end that is disposed adjacent to the drive pinion and a second end that is disposed opposite the first end, and the first direction extends from the second end toward the first end.

9. The axle assembly of claim 7 wherein the first flank and the second flank are substantially planar.

10. The axle assembly of claim 7 wherein the first flank and the second flank are disposed in first and second planes, respectively, that intersect and that are disposed in a non-parallel relationship with the first axis.

11. The axle assembly of claim 7 wherein the first flank is disposed in a first plane, the second flank is disposed in a second plane, one of the first plane and the second plane is disposed parallel to the first axis, and the other of the first plane and the second plane is disposed in a non-parallel relationship with the first axis.

12. The axle assembly of claim 7 wherein the first flank and the second flank are nonlinear.

13. The axle assembly of claim 12 wherein the first flank and the second flank each extend along an arc.

14. The axle assembly of claim 1 wherein each detection feature protrudes away from the first axis and has first flank and a second flank disposed opposite the first flank, wherein the first flank has a stepped profile with respect to a center plane of the detection feature that is disposed between the first flank and the second flank.

15. The axle assembly of claim 14 wherein the first flank and the second flank have mirror symmetry with respect to the center plane, the first axis is disposed in the center plane, and the center plane bisects the detection feature.

16. The axle assembly of claim 14 wherein the first flank has a first flank segment, a second flank segment that is disposed closer to the center plane than the first flank segment, and a third flank segment that is disposed closer to the center plane than the second flank segment, wherein the sensor detects the second flank segment when the shift collar is in a neutral position.

17. An axle assembly comprising:
an electric motor module;
a gear reduction module that is operatively connected to the electric motor module, the gear reduction module including a planetary gear set that has a sun gear that is operatively connected to the electric motor module, a planetary ring gear, a planet gear that meshes with the sun gear and the planetary ring gear, and a planet gear carrier that rotatably supports the planet gear;
a drive pinion that is rotatable about a first axis;
a shift collar that is rotatable with the drive pinion and moveable along the first axis such that the shift collar is selectively couplable to the sun gear or the planet gear carrier, the shift collar having a first toothed ring, a second toothed ring, and a third toothed ring that are positioned along the first axis, wherein the first toothed ring, the second toothed ring, and the third toothed ring have different numbers of teeth; and
a sensor that is configured to detect teeth of the first toothed ring, the second toothed ring, or the third toothed ring and provide a signal indicative of rotation of the shift collar about the first axis and positioning of the shift collar along the first axis.

18. The axle assembly of claim 17 wherein the shift collar is moveable between a first position in which the shift collar couples the drive pinion to the sun gear, a second position in which the shift collar couples the drive pinion to the planet gear carrier, and a third position in which the shift collar is decoupled from the sun gear and the planet gear carrier, wherein the sensor detects the first toothed ring when the shift collar is in the first position, detects the second toothed ring when the shift collar is in the second position, and detects that third toothed ring when the shift collar is in the third position.

19. The axle assembly of claim 17 wherein the shift collar has a first end that is disposed adjacent to the drive pinion, a second end that is disposed opposite the first end, and a shift collar groove that receives a linkage that couples the shift collar to an actuator, wherein the first toothed ring, the second toothed ring, and the third toothed ring are axially positioned between the shift collar groove and the second end.

20. The axle assembly of claim 17 wherein teeth provided with the first toothed ring, the second toothed ring, and the third toothed ring have the same configuration.

\* \* \* \* \*